(12) United States Patent
Banister

(10) Patent No.: US 11,194,769 B2
(45) Date of Patent: Dec. 7, 2021

(54) SYSTEM AND METHOD FOR RE-SYNCHRONIZING A PORTION OF OR AN ENTIRE SOURCE DATABASE AND A TARGET DATABASE

(71) Applicant: Richard Banister, Escondido, CA (US)

(72) Inventor: Richard Banister, Escondido, CA (US)

( * ) Notice: Subject to any disclaimer, the term of this patent is extended or adjusted under 35 U.S.C. 154(b) by 0 days.

(21) Appl. No.: 16/860,007

(22) Filed: Apr. 27, 2020

(65) Prior Publication Data
US 2021/0334239 A1    Oct. 28, 2021

(51) Int. Cl.
*G06F 16/178*   (2019.01)
*G06F 16/11*    (2019.01)
*G06F 16/23*    (2019.01)

(52) U.S. Cl.
CPC .......... *G06F 16/178* (2019.01); *G06F 16/113* (2019.01); *G06F 16/2379* (2019.01)

(58) Field of Classification Search
CPC ... G06F 16/178; G06F 16/2379; G06F 16/113
See application file for complete search history.

(56) References Cited

U.S. PATENT DOCUMENTS

| | | |
|---|---|---|
| 5,455,945 A | 10/1995 | VanderDrift |
| 5,721,918 A | 2/1998 | Nilsson |
| 5,806,067 A | 9/1998 | Connor |
| 5,909,678 A | 6/1999 | Bergman |
| 6,073,131 A | 6/2000 | Roberti |
| 6,161,111 A | 12/2000 | Mutalik |
| 6,208,990 B1 | 3/2001 | Suresh et al. |
| 6,324,581 B1 | 11/2001 | Xu |
| 6,564,215 B1 | 5/2003 | Hsiao |
| 6,850,947 B1 | 2/2005 | Chung |
| 7,293,027 B2 | 11/2007 | Margolus |
| 7,330,997 B1 | 2/2008 | Odom |
| 7,467,267 B1 | 12/2008 | Mayock |
| 7,774,315 B1 | 8/2010 | Galker |
| 7,822,717 B2 | 10/2010 | Kapoor |
| 7,917,512 B2 | 3/2011 | Bhide |
| 7,941,408 B2 | 5/2011 | Sinha |
| 7,953,710 B2 * | 5/2011 | Novik ................... G06F 16/273 707/692 |
| 8,099,392 B2 | 1/2012 | Paterson et al. |
| 8,117,165 B1 | 2/2012 | Winckelmann |
| 8,122,040 B2 | 2/2012 | Banister et al. |

(Continued)

*Primary Examiner* — Miranda Le
(74) *Attorney, Agent, or Firm* — Patrick Reilly

(57) ABSTRACT

A system and method to ensure the consistency of a data warehouse or backup database with a source database are described. The method alleviates issues of comparing two sets of the same data on disparate network systems and eliminates having to reload the entire target database or compare every field to ensure reasonable consistency of the contents. The process involves loading a unique record identifier, an optional record change timestamp, and an optional record archive field of a source database into a work file or temporary database table. Source work file records or temporary database tables records that do not exist in the target database or have timestamp mismatches are retrieved from the source database and added to or updated in the target database. Target database records that are archived or missing in the work file or temporary database table are archived or deleted from the target database.

28 Claims, 23 Drawing Sheets

(56) References Cited

U.S. PATENT DOCUMENTS

| | | | |
|---|---|---|---|
| 8,296,221 B1 | 10/2012 | Waelbroeck | |
| 8,301,652 B2 * | 10/2012 | Zhou | G06F 16/2477 707/769 |
| 8,311,988 B2 | 11/2012 | Cisler | |
| 8,352,490 B2 | 1/2013 | Hansen | |
| 8,375,010 B2 | 2/2013 | Banister et al. | |
| 8,442,951 B1 | 5/2013 | Brannon | |
| 8,495,041 B2 * | 7/2013 | Enoki | G06F 16/24552 707/700 |
| 8,548,945 B2 | 10/2013 | Dwyer et al. | |
| 8,666,944 B2 | 3/2014 | Beatty | |
| 8,745,029 B2 | 6/2014 | Banister et al. | |
| 8,812,482 B1 | 8/2014 | Kapoor | |
| 8,819,335 B1 | 8/2014 | Salessi et al. | |
| 8,954,401 B2 | 2/2015 | Zhang et al. | |
| 9,454,587 B2 | 9/2016 | Lyons | |
| 9,754,001 B2 | 9/2017 | Banister et al. | |
| 10,025,673 B1 | 7/2018 | Maccanti | |
| 2002/0004883 A1 | 1/2002 | Nguyen | |
| 2002/0059299 A1 * | 5/2002 | Spaey | G06F 16/27 |
| 2002/0078218 A1 | 6/2002 | Feig | |
| 2002/0095413 A1 * | 7/2002 | Meding | G06F 16/27 |
| 2002/0138376 A1 | 9/2002 | Hinkle | |
| 2002/0161784 A1 | 10/2002 | Tarenskeen | |
| 2003/0120625 A1 | 6/2003 | Jackson | |
| 2004/0078228 A1 | 4/2004 | FitzGerald | |
| 2004/0236796 A1 | 11/2004 | Bhatt | |
| 2005/0055518 A1 | 3/2005 | Hochberg | |
| 2005/0055519 A1 | 3/2005 | Stuart | |
| 2005/0120062 A1 | 6/2005 | Sinha | |
| 2006/0020616 A1 | 1/2006 | Hardy | |
| 2006/0085608 A1 | 4/2006 | Saika | |
| 2006/0179155 A1 | 8/2006 | Bunting | |
| 2006/0190947 A1 | 8/2006 | Ghosh | |
| 2007/0028056 A1 | 2/2007 | Harris | |
| 2007/0100913 A1 | 5/2007 | Sumner | |
| 2007/0106666 A1 | 5/2007 | Beckerle | |
| 2007/0106845 A1 | 5/2007 | Chu | |
| 2007/0136381 A1 | 6/2007 | Cannon | |
| 2007/0183224 A1 | 8/2007 | Erofeev | |
| 2007/0185937 A1 | 8/2007 | Prahlad | |
| 2007/0186068 A1 | 8/2007 | Agrawal | |
| 2008/0021926 A1 | 1/2008 | Brock | |
| 2008/0034011 A1 | 2/2008 | Cisler | |
| 2008/0184232 A1 | 7/2008 | Clark | |
| 2008/0263007 A1 | 10/2008 | Schmidt | |
| 2008/0307345 A1 | 12/2008 | Hart | |
| 2008/0307347 A1 | 12/2008 | Gisler | |
| 2009/0031006 A1 | 1/2009 | Johnson | |
| 2009/0077075 A1 | 3/2009 | Bent | |
| 2009/0150336 A1 | 6/2009 | Basu | |
| 2009/0210429 A1 | 8/2009 | Agrawal | |
| 2009/0249005 A1 | 10/2009 | Bender | |
| 2009/0287746 A1 * | 11/2009 | Brown | G06F 16/93 |
| 2010/0082553 A1 | 4/2010 | Beatty | |
| 2010/0318495 A1 | 12/2010 | Yan | |
| 2011/0082890 A1 | 4/2011 | Banister | |
| 2011/0167148 A1 | 7/2011 | Bodziony et al. | |
| 2011/0282890 A1 | 11/2011 | Griffith | |
| 2011/0320400 A1 | 12/2011 | Namini | |
| 2012/0124081 A1 | 5/2012 | Ebrahimi | |
| 2012/0221522 A1 | 8/2012 | Allman et al. | |
| 2012/0254137 A1 | 10/2012 | Rozenwald | |
| 2012/0323924 A1 | 12/2012 | Okun | |
| 2013/0036089 A1 | 2/2013 | Lucas | |
| 2013/0042083 A1 | 2/2013 | Mutalik | |
| 2013/0191523 A1 | 7/2013 | Buck | |
| 2013/0212599 A1 | 8/2013 | Giampaolo | |
| 2013/0232331 A1 | 9/2013 | Farhan | |
| 2013/0238552 A1 | 9/2013 | Salb | |
| 2013/0275379 A1 | 10/2013 | Trebas | |
| 2013/0339379 A1 | 12/2013 | Ferrari | |
| 2013/0346365 A1 | 12/2013 | Kan | |
| 2014/0006357 A1 | 1/2014 | Davis | |
| 2014/0007239 A1 | 1/2014 | Sharpe | |
| 2014/0074790 A1 | 3/2014 | Berman | |
| 2014/0229506 A1 | 8/2014 | Lee | |
| 2015/0066865 A1 | 3/2015 | Yara | |
| 2015/0205850 A1 | 7/2015 | Lu | |
| 2015/0269215 A1 | 9/2015 | Lehouillier | |
| 2015/0331755 A1 | 11/2015 | Morgan | |
| 2015/0378865 A1 | 12/2015 | Robertson | |
| 2016/0259821 A1 * | 9/2016 | Rao | G06F 16/2477 |
| 2016/0352815 A1 | 12/2016 | Mozolewski | |

* cited by examiner

|   | A | B | C |
|---|---|---|---|
| 1 | ID# | DTS | OTHER DATA.... |
| 2 | 001 | 1/17/19 | red |
| 3 | 003 | 3/5/19 | beige |
| 4 | 004 | 6/12/19 | viridian |
| 5 | 005 | 2/2/19 | blue |
| 6 | 002 | 4/30/19 | sunglow |
| 7 | 008 | 6/12/19 | lavender |
| 8 | 009 | 6/13/19 | white |
| 9 |  |  |  |
| 10 |  |  |  |
| 11 |  |  |  |

| | A | B | C |
|---|---|---|---|
| 1 | ID# | DTS | OTHER DATA.... |
| 2 | 001 | 1/17/19 | red |
| 3 | 003 | 3/5/19 | beige |
| 4 | 004 | 6/12/19 | viridian |
| 5 | 005 | 2/2/19 | blue |
| 6 | 002 | 4/30/19 | sunglow |
| 7 | 008 | 6/12/19 | lavender |
| 8 | 009 | 6/13/19 | white |
| 9 | | | |
| 10 | | | |
| 11 | | | |

SOURCE DATABASE 104

7.06. EXTRACT AND SEND REQUESTED RECORDS

REQUEST LIST 704
004
002
008
009

FIGURE 7D

|   | A    | B       | C          |
|---|------|---------|------------|
| 1 | ID#  | DTS     | OTHER DATA...|
| 2 | 001  | 1/17/19 | red        |
| 3 | 003  | 3/5/19  | beige      |
| 4 | 004  | 6/12/19 | viridian   |
| 5 | 005  | 2/2/19  | blue       |
| 6 | 002  | 4/30/19 | sunglow    |
| 7 | 008  | 6/12/19 | lavender   |
| 8 | 009  | 6/13/19 | white      |
| 9 |      |         |            |
| 10|      |         |            |
| 11|      |         |            |

SOURCE DATABASE 104

706A, 706B, 706C, 706D 7.06. EXTRACT AND SEND REQUESTED RECORDS

REQUEST LIST 704
004
002
008
009

FIGURE 7E 7.08. UPDATE

| | 706A | 706B | 706C | 706D |
|---|---|---|---|---|
| | 004 \| 6/12/19 \| viridian | 002 \| 4/30/19 \| sunglow | 008 \| 6/12/19 \| lavender | 009 \| 6/13/19 \| white |

TARGET DATABASE 108

| | A | B | C |
|---|---|---|---|
| | ID# | DTS | OTHER DATA... |
| 1 | 001 | 1/17/19 | red |
| 2 | 002 | 4/18/19 | orange |
| 3 | 003 | 3/29/19 | yellow |
| 4 | 004 | 6/1/19 | green |
| 5 | 005 | 2/2/19 | blue |
| 6 | ~~007~~ | ~~1/19/19~~ | ~~indigo~~ |
| 7 | 008 | 5/12/19 | violet |
| 8 | | | |
| 9 | | | |
| 10 | | | |
| 11 | | | |

FIGURE 7F

7.08. UPDATE

TARGET DATABASE 108

| | A | B | C |
|---|---|---|---|
| | ID# | DTS | OTHER DATA.... |
| 1 | 001 | 1/17/19 | red |
| 2 | 002 | 4/30/19 | sunglow |
| 3 | 003 | 3/29/19 | yellow |
| 4 | 004 | 6/12/19 | viridian |
| 5 | 005 | 2/2/19 | blue |
| 6 | ~~007~~ | ~~1/19/19~~ | ~~indigo~~ |
| 8 | 008 | 6/12/19 | lavender |
| 9 | 009 | 6/13/19 | white |
| 10 | | | |
| 11 | | | |

FIGURE 7G

| HEADER | A | B | C | D | E |
|---|---|---|---|---|---|
| 1 | circle | red | 4/21/2020 | good | Calvin |
| 2 | triangle | red | 5/30/2019 | excellent | Samantha |
| 3 | square | blue | 1/17/2017 | poor | Karen |
| 4 | rectangle | yellow | 6/10/2005 | good | Samantha |
| 5 | circle | green | 3/29/2010 | fine | Calvin |
| 6 | square | green | 5/2/2013 | excellent | Marie |
| 7 | hexagon | green | 6/24/1995 | poor | Dan |
| 8 | triangle | blue | 9/1/2017 | awful | Karen |
| 9 | circle | yellow | 8/12/2018 | good | Dan |

SYSTEM AND METHOD FOR RE-SYNCHRONIZING A PORTION OF OR AN ENTIRE SOURCE DATABASE AND A TARGET DATABASE

FIELD OF THE INVENTION

The present invention relates to a process for the maintenance and updating of digitized records. More particularly, the present invention relates to a system for restoring the state of a records database to the state existing before a specific time or event-time occurrence or validating and repairing records missed during normal replication.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Databases are ubiquitous and crucial in consumer, business, and government operations. Copying a database to a reporting data warehouse or a backup repository may have high value for a business. However, any discrepancies in the backup could cause reports using the data warehouse to yield incorrect results or recovery from the backup to incorrectly restore data to the original database. There is a long-felt need to ensure the data integrity of the data warehouse or backup repository without having to delete and reload all of the data each time.

SUMMARY AND OBJECTS OF THE INVENTION

Towards these objects and other objects that will be made obvious in light of the present disclosure, an invented system (hereinafter, "the present invention") and method of the present invention (hereinafter, "the invented method") are provided to enable the verification of a database backup from a source database and correction of any discrepancies.

In a first preferred embodiment of the invented method, a software record revision is received and is selected or assigned for inclusion in a first database. When an earlier version of this database record instance is currently stored in the target database, the earlier database record is updated in the target database. If the record does not exist in the target, it is added. If a record no longer exists in the source database, there is provided optionally a mechanism to remove it or do a soft delete by setting a record indicator to indicate that it has been deleted. There is also an optional mechanism to update the data only if the contents are not the same so resources aren't wasted copying the entire set of database tables or object.

In still other aspects of invented method, the target database may optionally receive and update software records in one of two manners. First, the archive may optionally receive software records and record revisions in a batch method, i.e. by receiving a plurality of records from a remote source server within a substantively contemporaneous download, and by updating and storing the software records and record revision as a group. Additionally and optionally, the target database may optionally receive and update the software records and record updates in real time, i.e. when a software record is created or updated, the software record may be individually transmitted to the target database to be stored.

The source database and/or the target database may be or comprise a relational database, an object-oriented database, a NoSQL database, XML, JSON, flat files, Software-as-a Service databases or other suitable data storage methods known in the art.

A NoSQL database does not necessarily follow the strict rules that govern transactions in relational databases. These violated rules are Atomicity, Consistency, Integrity, Durability. For example, NoSQL databases do not use fixed schema structures and SQL joins.

Some preferred embodiments of the invention provide a computer-implemented method comprising: storing of a source database in a computer system, wherein a plurality of source records of the source database each include a date time stamp of a most recent revision and a unique record identifier, wherein each record identifier is a unique signifier within the source database and a record creation event is a type of record revision; storing a target database in a computer memory, wherein the target database receives copies of revisions of the plurality of source records; selection within the target database of a plurality of records to update; generating a source work file comprising source compound keys extracted from each current source record of the plurality of source records, and each source compound key extracted from a same source record and including a source record identifier and a most recent source date time stamp of the same source record; sorting the source compound keys of the source work file into a source ordered list according to a value sequence of the source record identifiers of the source compound keys; generating a target work file comprising target compound keys extracted from each current target record of the plurality of target records, and each target compound key extracted from a same target record and including a target record identifier and a most recent target date time stamp of the same target record; sorting the target compound keys of the target work file into a target ordered list according to the value sequence of the record identifiers of the target compound keys as applied to order the source ordered list of the source work file; comparing the source work file and the target work file to generate a retrieval work file that lists source compound keys not found to be matched in the target work file by a target compound key having a same target record identifier and target date time stamp; and writing all source records having corresponding source compound keys listed in the retrieval work file into the target database.

It is understood that a source compound key, in yet additional various preferred embodiments of the invented method, may be generated by extracting or deriving at least two elements of source information that are wholly or partially associated with or contained within a same source records, and that the scope of the meaning of the term source information source includes record identifiers, such as but not limited to prior art record identifiers, and date time stamps of record creations, updates, access and external events.

It is further understood that a target compound key, in yet additional various preferred embodiments of the invented method, may be generated by extracting or deriving at least two elements of source information that are wholly or partially associated with or contained within a same target record, and that the scope of the meaning of the term target information source includes record identifiers, such as but not limited to prior art record identifiers, and date time stamps of record creations, updates, access and external events.

Additionally and optionally included in this invented method may be records listed as source compound keys in the source work file and not present as target compound keys in the target work file being added to the retrieval work file.

Additionally and optionally included in this invented method may be records listed as target compound keys in the target work file and not present as source compound keys in the source work file having an archive field set to a deletion indicator value.

This invented method may further comprise deleting any target record having a unique record identifier presented in a source record when the source record comprises an archive field having a deletion indicator value.

This invented method may further comprise each source record having an archive field and no source compound key of a source record having any archive field set to a deletion indicator value being written into the source work file.

This invented method may further comprise each source record having an archive field and only source compound keys of source record having any archive field set to an active record indicator value are written into the source work file.

This invented method may further comprise the source record identifier being a composite key comprising information derived from two or more data fields of the comprising source record comprising the source record identifier.

This invented method may further comprise the target record identifier being a compound key comprising information derived from two or more data fields of the target record comprising the target record identifier.

This invented method may further comprise the plurality of source records being assigned to individual threads of the multithreaded process in view of each date time stamp of the individual source record.

This invented method may further comprise the source database being a relational database, NoSQL database, graph database, or object-oriented database.

This invented method may further comprise each source compound key extracted from the source database having a date time stamp corresponding to a time no earlier than indicated by a pre-selected date time value.

This invented method may further comprise at least one target record has an archive field indicating that a corresponding source record is deleted.

This invented method may further comprise the at least one target record further comprising additional source data record field content of the corresponding source record that was present at the time of the corresponding source record being deleted from the source database.

This invented method may further comprise the computer memory storing the target database being integral to the computer system.

Some alternate preferred embodiments of the invention provide a database management system, comprising: a processor comprising hardware; and a memory storing a database management system adapted to update a first database with information received via an electronic communications network and the memory further storing executable instructions that, when executed by the processor, perform operations comprising: storing a source database in a computer system, wherein a plurality of source records of the source database each include a date time stamp of a most recent revision and a unique record identifier, wherein each record identifier is a unique signifier within the source database and a record creation event is a type of record revision; storing a target database in a computer memory, wherein the target database receives copies of revisions of the plurality of source records; selection within the target database of a plurality of records to update; generating a source work file comprising source compound keys extracted from each current source record of the plurality of source records, and each source compound key extracted from a same source record and including a source record identifier and a most recent source date time stamp of the same source record; sorting the source compound keys of the source work file into a source ordered list according to a value sequence of the source record identifiers of the source compound keys; generating a target work file comprising target compound keys extracted from each current target record of the plurality of target records, and each target compound key extracted from a same target record and including a target record identifier and a most recent target date time stamp of the same target record; sorting the target compound keys of the target work file into a target ordered list according to the value sequence of the record identifiers of the target compound keys as applied to order the source ordered list of the source work file; comparing the source work file and the target work file to generate a retrieval work file that lists source compound keys not found to be matched in the target work file by a target compound key having a same target record identifier and target date time stamp; and writing all source records having corresponding source compound keys listed in the retrieval work file into the target database.

This invented method may further comprise records listed as source compound keys in the source work file and not present as target compound keys in the target work file being deleted from the target database.

This invented method may further comprise records listed as target compound keys in the target work file and not present as source compound keys in the source work file having an archive field set to a deletion indicator value.

This invented method may further comprise the computer memory storing the target database being integral to the database management system.

This invented method may further comprise the computer memory storing the target database being external to the database management system.

Some alternate preferred embodiments of the invention provide a database management system, the database management system bi-directionally communicatively coupled with a computer system that stores a source database, wherein a plurality of source records of the source database each include a date time stamp of a most recent revision and a unique record identifier, and each record identifier is a unique signifier within the source database, the database management system comprising: a processor comprising hardware; and a memory storing a database management system adapted to update a first database with information received via an electronic communications network and the memory further storing executable instructions that, when executed by the processor, perform operations comprising: storing a target database in a computer memory, wherein the target database receives copies of revisions of the plurality of source record and stores the revisions of the plurality of source records as target records, and a record creation event is processed as a type of record revision; generating a new or truncated temporary table from a prior comparison operation; writing at least one key and at least one archive value for each record in the source database into the temporary table; comparing all of the keys of active records of the temporary table with a SQL statement to determine which records referenced by the temporary table are missing or marked as archived in the target database table; generating a refresh list of the record identifiers of each target database record determined to require an update; downloading all records associated with a record identifier of the refresh list from the source database and adding each downloaded record to the target database; and comparing records in the temporary table and the target database table to determine which records that are marked archived in the temporary table are showing as active in the target database table by checking all active records in the target database table against the list of active records in the temporary table.

This invented method may further comprise records not listed in the temporary table and present in the target table being deleted from the target database.

This invented method may further comprise records not listed in the temporary table and present in the target table having an archive field set to a deletion indicator value.

This invented method may further comprise the executable instructions further directing the processor to perform additional operations of writing each timestamp from the source database for each record associated with a record identifier in the temporary table into the temporary table prior to comparing all of the keys in the target database table with a SQL statement to determine which records are missing from the target database or marked as archived in the target database.

This invented method may further comprise the executable instructions still further directing the processor to perform additional operations of comparing all of the keys in the target database table with a SQL statement to determine which records are missing from the target database or marked as archived in the target database.

This invented method may further comprise the executable instructions further directing the processor to perform additional operations of comparing time stamps associated with a target database table record and temporary table entry associated with the same key to determine whether the record in the target database is current, or whether the source database contains a newer version of the record.

This invented method may further comprise the executable instructions further directing the processor to perform additional operations comprising: applying a fixed or configurable or automatically determined starting time to filter the records in the source database table into the temporary table; generating an ancillary list of record identifiers of added or changed records from only a plurality of active records captured in the temporary table to add or update the record data in the target table; and downloading the source records associated of record identifiers of the ancillary list, and inserting or updating the corresponding target database records associated of record identifiers in the target table with the newly downloaded records.

This invented method may further comprise the executable instructions further directing the processor to perform additional operations of marking each target record of the target database referenced in the target table as archived when a same record identifier of the temporary table is marked as archived.

This invented method may further comprise the executable instructions further directing the processor to perform the method upon a designated subset of the records in the target database.

Further, any of these invented methods might also include enactments of similar processes without referring to a timestamp attached to or associated with a record, and ascertaining which records to download, replace, or update by other available suitable means known in the art, such as but not limited to checking system logs or using a data field to track changes and updates that isn't representing a time or date such as a revision number.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

INCORPORATION BY REFERENCE

All publications, patents, and patent applications mentioned in this specification are herein incorporated by reference to the same extent as if each individual publication, patent, or patent application was specifically and individually indicated to be incorporated by reference. U.S. Pat. No. 9,754,001 titled "Method of integrating remote databases by automated client scoping of update requests prior to download via a communications network" issued on Sep. 5, 2017 to Inventors Banister, R. and Dubberley, W.; U.S. Pat. No. 10,089,333 titled "Method and system for dynamically modifying database metadata and structures" issued on Oct. 2, 2018 to Inventors Banister, R., and Dubberley, W.; and U.S. Pat. No. 10,003,634 titled "Multi-threaded download with asynchronous writing" issued on Jun. 19, 2018 to Inventors Banister, R. and Dubberley, W. are incorporated herein by reference in their entirety and for all purposes.

BRIEF DESCRIPTION OF THE FIGURES

These, and further features of the invention, may be better understood with reference to the accompanying specification and drawings depicting the preferred embodiment, in which:

FIG. 5 is a table representing an example embodiment of the source database;

FIGS. 7D and 7E are diagrams presenting step 7.06 of the example presented in FIGS. 7A-7G, wherein the example records specified by the request list are selected and extracted from the example source database; and FIGS. 7F and 7G are diagrams presenting the target database of the example presented in FIGS. 7A-7G being updated with the records transmitted in step 7.06 of the example.

FIG. 16 is an example database table facilitating a further example and explanation of implementing compound unique keys.

DETAILED DESCRIPTION

Figure 1:
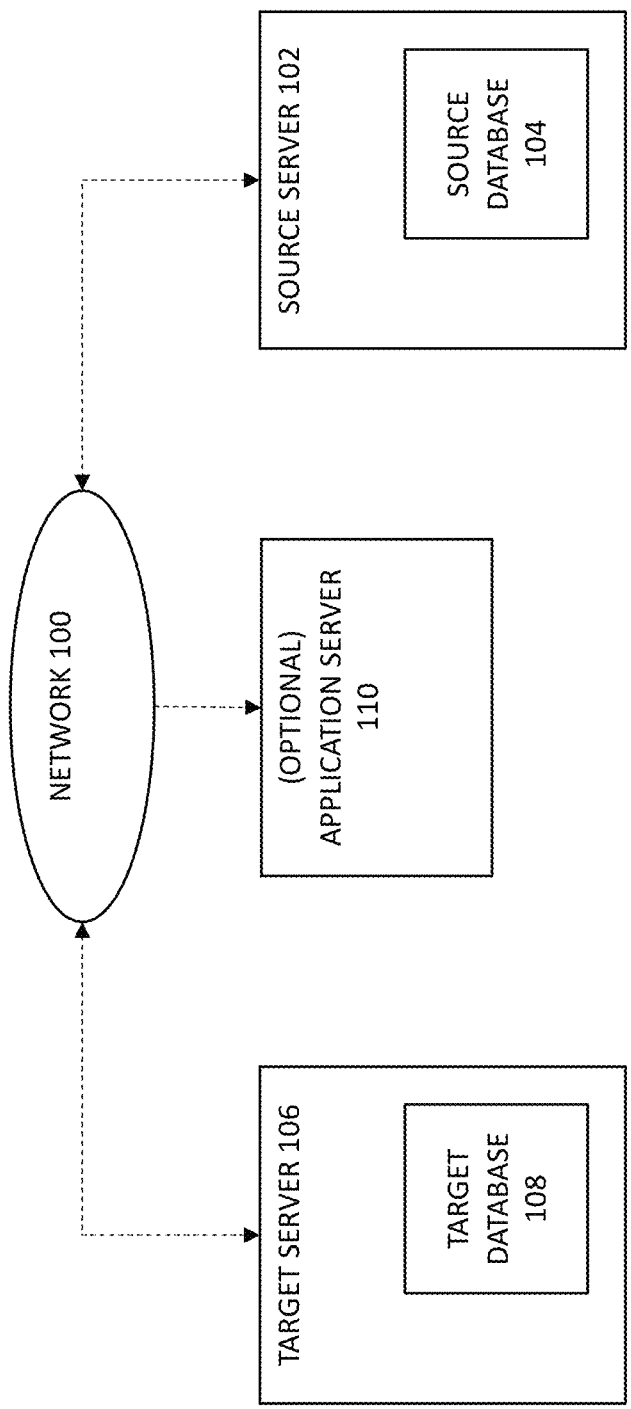
FIG. 1 is a diagram of an electronic communications network, comprising a target server, a source server, and an optional application server bidirectionally communicatively coupled by means of this network.

In the following detailed description of the invention, numerous details, examples, and embodiments of the invention are described. However, it will be clear and apparent to one skilled in the art that the invention is not limited to the embodiments set forth and that the invention can be adapted for any of several applications.

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims. Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

When elements are referred to as being "connected" or "coupled," the elements can be directly connected or coupled together or one or more intervening elements may also be present. In contrast, when elements are referred to as being "directly connected" or "directly coupled," there are no intervening elements present.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

The subject matter may be embodied as devices, systems, methods, and/or computer program products. Accordingly, some or all of the subject matter may be embodied in hardware and/or in software, to include firmware, resident software, micro-code, state machines, gate arrays, etc. Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks or DVDs, or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Throughout this specification, like reference numbers signify the same elements throughout the description of the figures.

Referring now generally to the Figures, and particularly to FIG. 1, FIG. 1 is a diagram of an electronic communications network 100, comprising a source server 102 that hosts a source database 104, a target server 106 that hosts a target database 108, and, optionally, an application server 110, all bidirectionally communicatively coupled by means of this network 100.

It is understood that the term 'server' is being used herein as referring collectively to the hardware and software of a computer that together enable and direct this computer to make available or provide a certain service. In the present instance, the relevant service being provided by the source server 102 is access to the source database 104 via enabling software that may include the source DBMS 102I of FIG. 2 in addition to other enabling software SW.SRC installed on the source server 104 including but not limited to standard network utilities as known in the art.

Figure 2:
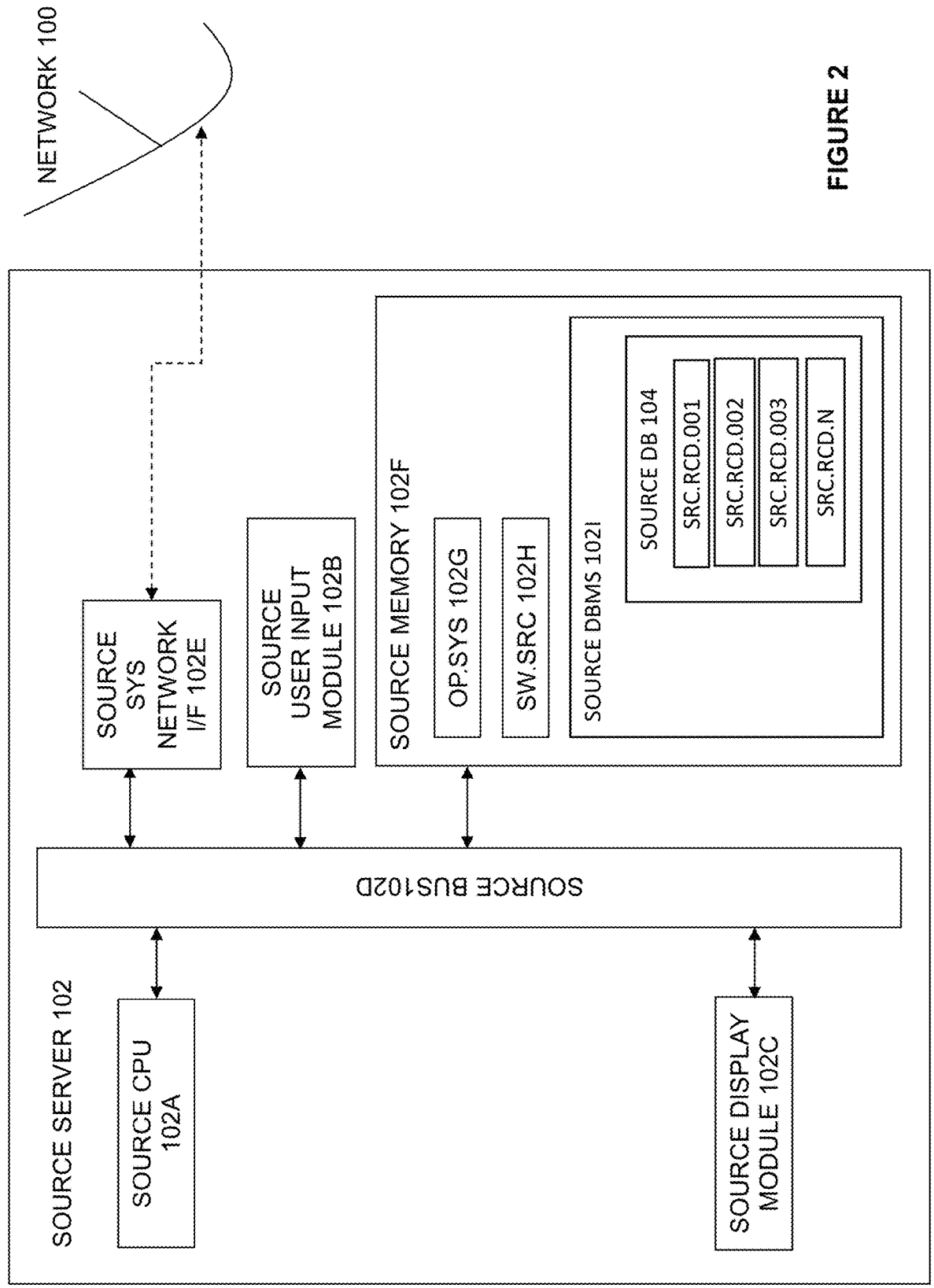
FIG. 2 is a block diagram of the source server of the electronic communications network of FIG. 1.

Therefore, the source server 102 as presented in FIG. 1 and FIG. 2 and referenced throughout is understood to represent both a physical computer connected to a network 100 by physical means such as a cable or wireless mechanism, and also the software hosted by this same computer that enables bidirectional data transmission and reception by means of the electronic communications network 100, in addition to software functions enabling this server's providing the service relevant to the present invention, namely access to the source database 104 and software functionality in accordance with the invented method. Additionally, it should be noted that a single computing platform with sufficient capacity to do so may host multiple server functions; therefore, while it might still be helpful conceptually to think of each server function as a separate computer communicating within a network together, one should remember that sometimes the 'other computer' being communicated with might in fact be the same computer platform, enacting a different server function. That also means that the present invented method might be occurring all on the same computing platform.

Figure 3:
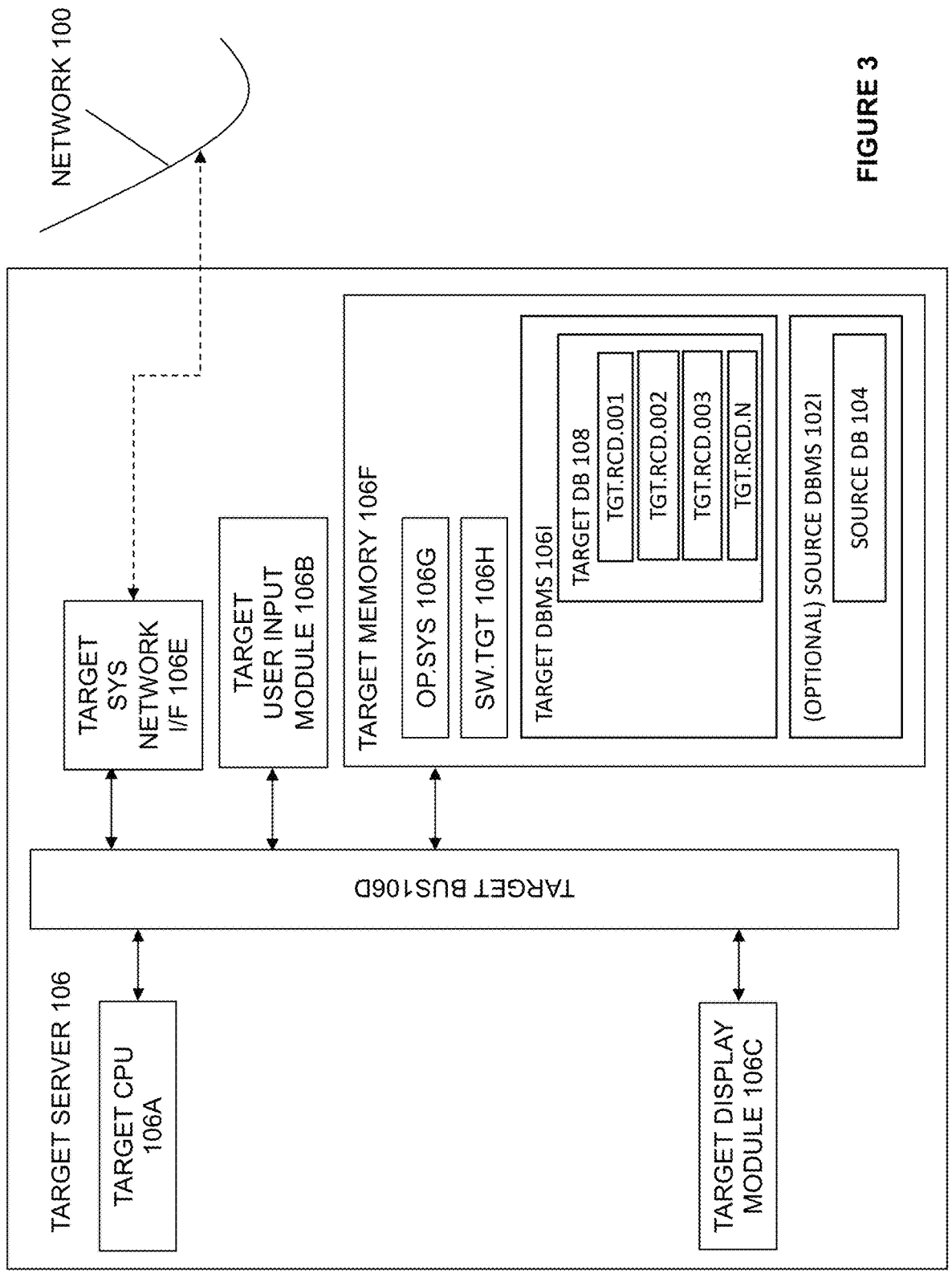
FIG. 3 is a block diagram of the target server of the electronic communications network of FIG. 1.

Additionally, the target server 106 as presented in FIG. 1 and FIG. 3 and referenced throughout is understood to represent both a physical computer connected to a network 100 by physical means such as a cable or wireless mechanism, and the software hosted by this same computer that enables bidirectional data transmission and reception by means of such an electronic communications network 100, in addition to software functions enabling this server's providing the service relevant to the present invention, namely access to the target database 108 and software functionality in accordance with the invented method.

Figure 11:
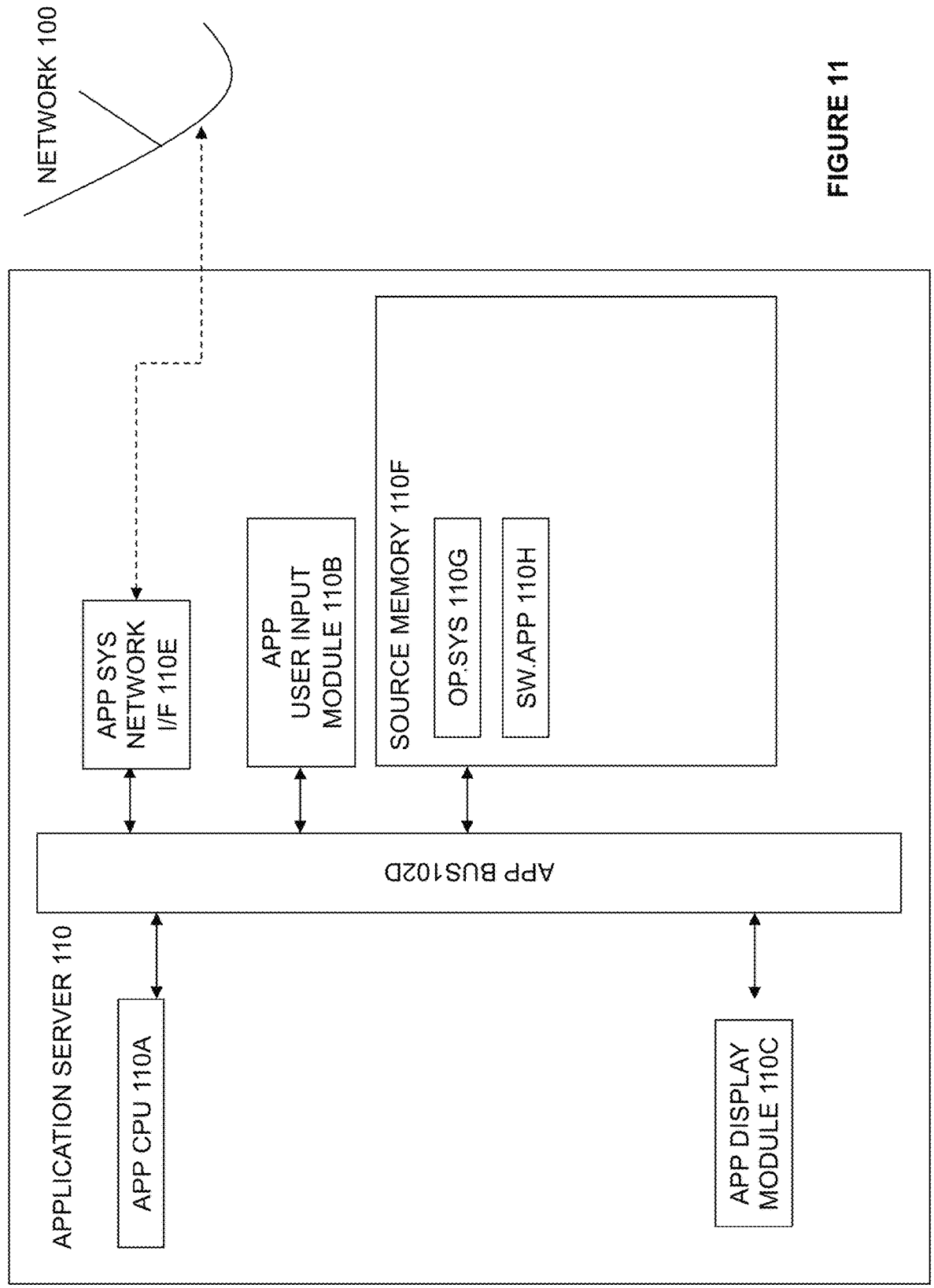
FIG. 11 is a block diagram of the application server of the electronic communications network of FIG. 1.

Additionally, the application server 110 as presented in FIG. 1 and FIG. 11 and referenced throughout is understood to represent both a physical computer connected to a network 100 by physical means such as a cable or wireless mechanism, and the software SW.APP hosted by this same computer that enables bidirectional data transmission and reception by means of such an electronic communications network 100, in addition to software functions enabling this server's providing the service relevant to the present invention, namely operation of one or more software application(s) SW.APP that direct and enact the invented method in coordination with the source server 102 and target server 106.

Referring now generally to the Figures, and particularly to FIG. 2, FIG. 2 is a block diagram of the source server 102 of the electronic communications network 100 of FIG. 1 and displaying together both hardware and software aspects thereof, wherein the source system 102 comprises: a central processing unit or "CPU" 102A; a user input module 102B; a display module 102C; a software bus 102D bi-directionally communicatively coupled with the CPU 102A, the user input module 102B, the display module 102C; the software bus 102D is further bi-directionally coupled with a network interface 102E, enabling communication with alternate computing devices by means of the electronic communications network 100; and a source memory 102F. The source software bus 102D facilitates communications between the above-mentioned components of the source system 102.

The memory 102F of the source system 102 includes a source software operating system OP.SYS 102G. The source software OP.SYS 102G of the source system 102 may be selected from freely available, open source and/or commercially available operating system software, to include but not limited to a.) a Z8 G4 computer workstation marketed by Hewlett Packard Enterprise of San Jose, Calif. and running a Red Hat Linux™ operating system marketed by Red Hat, Inc. of Raleigh, N.C.; (b.) a Dell Precision™ computer workstation marketed by Dell Corporation of Round Rock, Tex., and running a Windows™ 10 operating system marketed by Microsoft Corporation of Redmond, Wash.; (d.) a Mac Pro workstation running MacOS X™ as marketed by Apple, Inc. of Cupertino, Calif.; or (e.) other suitable computational system or electronic communications device known in the art capable of providing networking and operating system services as known in the art.

The exemplary source server software program SW.SRC 102H consisting of executable instructions and associated data structures is optionally adapted to enable the source server 102 to (a.) generate messages and communicate with the target server 106, (b.) process communicate with and process messages received from the target server 106, and (c.) manage the source database management system 102I, called herein the "source DBMS 102I", which is hosting and managing one or more source databases 104 to perform, execute and instantiate all elements, aspects and steps as required of the source server 102 to practice the invented method in its various preferred embodiments in interaction with the target server 106. The source memory 102G further includes the source database management system 102I, herein called the "source DBMS" 102I, hosting and managing one or more source databases 104 that contain a plurality of source database records SRC.RCD.001-SRC.RCD.N. It is understood that in various alternated preferred embodiments of the invented method, that the source DBMS 102I may be, or comprise, od be comprised within a relational database management system, a NoSQL database management system, a graph database management system, an object-oriented database management system, an XML code database management system, a JSON code database management system, one or more flat digitized software files database management systems, and one or more Software-as-a Service database management systems accessible via a communications network. It is further understood that one or more databases 104 may be, or comprise, or be comprised within a relational database, a NoSQL database, a graph database, an object-oriented database, an XML code, a JSON code, one or more flat digitized software files, and one or more Software-as-a Service databases accessible via a communications network.

Referring now generally to the Figures, and particularly to FIG. 3, FIG. 3 is a block diagram of the target server 106 of the electronic communications network 100 of FIG. 1 and displaying together both hardware and software aspects thereof, wherein the target system 106 comprises: a central processing unit or "CPU" 106A; a user input module 106B; a display module 106C; a software bus 106D bi-directionally communicatively coupled with the CPU 106A, the user input module 106B, the display module 106C; the software bus 106D is further bi-directionally coupled with a network interface 106E, enabling communication with alternate computing devices by means of the electronic communications network 100; and a target memory 106F. The target software bus 106D facilitates communications between the above-mentioned components of the target system 106.

The memory 106F of the target system 106 includes a target software operating system OP. SYS 106G. The target software OP. SYS 106G of the target system 106 may be selected from freely available, open target and/or commercially available operating system software, to include but not limited to a.) a Z8 G4 computer workstation marketed by Hewlett Packard Enterprise of San Jose, Calif. and running a Red Hat Linux™ operating system marketed by Red Hat, Inc. of Raleigh, N.C.; (b.) a Dell Precision™ computer workstation marketed by Dell Corporation of Round Rock, Tex., and running a Windows™ 10 operating system marketed by Microsoft Corporation of Redmond, Wash.; (d.) a Mac Pro workstation running MacOS X™ as marketed by Apple, Inc. of Cupertino, Calif.; or (e.) other suitable computational system or electronic communications device known in the art capable of providing networking and operating system services as known in the art. The exemplary target server software program SW.SRC 106H consisting of executable instructions and associated data structures is optionally adapted to enable the target server 106 to (a.) generate messages and communicate with the source server 102, (b.) communicate with and process messages received from the source server 102, and (c.) manage a target database management system 106I, known as the "target DBMS 106I", which is hosting and managing one or more target databases 108 to perform, execute and instantiate all elements, aspects and steps as required of the target server 106 to practice the invented method in its various preferred embodiments interacting with the source server 102. Presented also in FIG. 3 is a plurality of target database records TGT.RCD.001-TGT.RCD.N within the target database 108.

Presented additionally is the source DBMS 102I as possibly and potentially hosted on the same server as the target DBMS 106I, in some alternate preferred embodiments of the present invention. The present invention is not limited to interactions taking place between two entirely separate computers; it is understood in the art that a single platform may host multiple distinct and separate server functions.

It is understood that in various alternated preferred embodiments of the invented method, that the target DBMS 106I may be, comprise, or be comprised within a relational database management system, a NoSQL database management system, a graph database management system, an object-oriented database management system, an XML code database management system, a JSON code database management system, one or more flat digitized software files database management systems, and one or more Software-as-a Service database management systems accessible via a communications network. It is further understood that one or more target databases 108 may be, or comprise, or be comprised within a relational database, a NoSQL database, a graph database, an object-oriented database, an XML code, a JSON code, one or more flat digitized software files, and one or more Software-as-a Service databases accessible via a communications network.

Figure 4A:
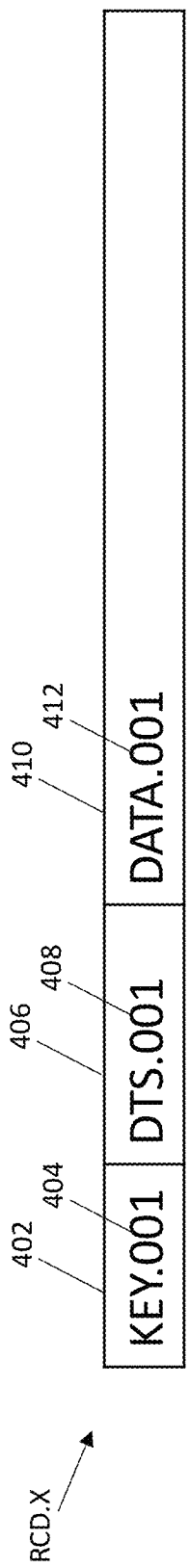
FIG. 4*a* is a block diagram presenting labeled data record diagrams for establishment of terminology as used in these Figures.
Figure 4B:
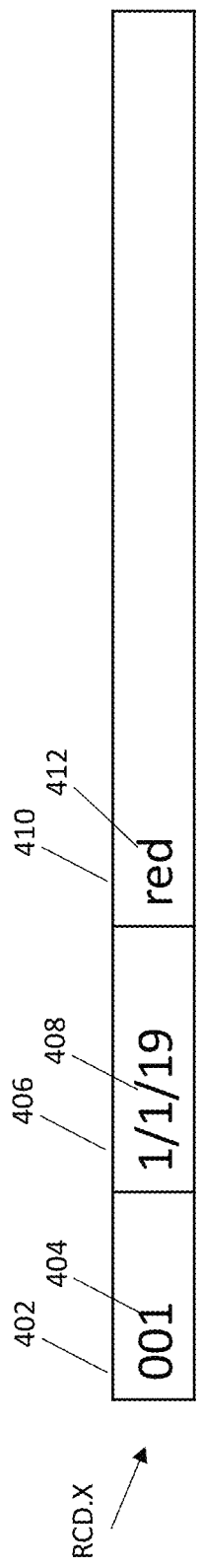
FIG. 4*b* is a block diagram presenting samples of actual data content.

Referring generally to the Figures and particularly to FIGS. 4A and 4B, FIGS. 4A and 4B each present a diagram of an exemplary database record RCD.X, for the purpose of establishing a context of terminology regarding the data fields of all database records as presented herein. The examples and terminology as established in FIGS. 4A and 4B may be considered as pertaining to both source database records SRC.RCD.001-SRC.RCD.N and target database records TGT.RCD.001-TGT.RCD.N, with the presented exemplary database record RCD.X serving as an example of either. FIG. 4A presents a block diagram of an exemplary database record RCD.X with value placeholders; FIG. 4B presents a block diagram of the exemplary same database record RCD.X with hypothetical example values presented in each data field instead of placeholders. It is noted that the term 'exemplary' in this context is meant to indicate that the exemplary database record RCD.X is a hypothetical example presented for explanatory purposes, not that the exemplary database record RCD.X is being praised as particularly excellent or special.

It should be understood that the data fields 402, 406 & 410 as presented in FIGS. 4A & 4B constitute only a bare minimum for ideal implementation of preferred embodiments of the invented method. Presence of all three of these data fields in some format (as discussed below, these may vary somewhat and still adhere to the principle behind the invented method) is not absolutely compulsory, but strongly recommended and included herein as a given assumption. First, preferred embodiments of the present invented method require that the databases 104 and 108 include a means of uniquely identifying each constituent record SRC.RCD.001-N and TGT.RCD.001-N. This is represented herein as a unique key data field 402, containing a unique key 404 that is not associated with any other record included within the same database system, and such that if any source database record SRC.RCD.X from the source database 104 and any target database record TGT.RCD.X from the target database 108 both include the same unique key 404, this source record SRC.RCD.X and this target record TGT.RCD.X are held as corresponding versions or copies of the same record, as instantiated in their respective databases 104 and 108. In FIG. 4A, the placeholder representing the unique key 404 is ID.001, and in FIG. 4B, the example value for the unique key 404 is 001. For the purposes of clear explanation, the examples herein represent the unique key field 402 as containing unique keys 404 in the form of ID numbers counting 001-009.

However, it should be understood that, for the purposes of the present invention, a unique key 404 need not be a number, assigned or otherwise. It is understood that a unique key 404 may be any size, format, or datatype sufficient or necessary to ensure that no duplicates of the same unique key 404 exist within the relevant database. Further, it is understood that a system of unique identification suitable for application as a unique key 404 could be implemented with compound keys, wherein the scope of meaning of the term "compound key" or "key" as used within the present disclosure may include one or more of the following: (a.) a combination of, (b.) a conjunction of, and/or (c.) a derivation from multiple data fields, and throughout this description the term unique key 404 is understood to include compound keys, and may refer to any data field 402 or combination of data fields or related information sufficient to uniquely identify one and only one record reliably. As an example, in a database full of books which contains no multiple copies or editions, there might understandably be two books with the same title or author, but it would be effectively impossible to find two different texts with the same title-and-author combination, so each unique text could be identified by use of the title-and-author combination without additionally labeling the books with identification numbers. For the purposes of the present invention, one might then consider the title field and author field combined or viewed in conjunction as the unique key 404 as relevant to the invented method implemented for that database of books. In all instances herein where unique keys 404 are discussed, the unique key as described is understood to be any kind of number, letter, string, byte, or any other datatype, or a compound key based on a combination or conjunction of one or more data fields. The only criterium for one or a conjunction of fields to be suitable as a unique key 404 is a one-to-one correspondence between unique keys 404 and records RCD.001-RCD.N, with no duplicate unique keys 404.

Further, as databases may also include metadata and other material associated with data records but not included in the data record itself, such material that is associated with a record, or data derived from same, might also be suitably applied as the unique key 404 in some cases, alone or in conjunction or combination with another data field or piece of metadata.

To reiterate, in the present disclosure, it should be understood that the term 'unique key 404' may refer to (a.) a single ID number; (b.) information sourced or derived from a single other data field; or (c.) a compound key. It is understood that the term "compound key" may include one or more of the following: (a.) multiple data fields in conjunction, combination, or concatenation; (b.) a key derived from one or more data fields; (c.) a piece of metadata associated with a record; (d.) multiple pieces of information associated with the record in conjunction, combination, or concatenation; or (e.) a key derived from one or more pieces of metadata. Any piece or pieces of data included in or associated with a record in the database that may be used to identify that record individually, uniquely, and exclusively, may be used as a unique key. Additionally, it should be clearly understood that, while portions of the disclosure simplify the unique key 404 to an ID number for visual and explanatory purposes, this is only simplified representation.

As another point regarding unique identifiers generally and unique keys 404 as employed in the present invention specifically, while a database having some form of unique identifier is preferred, there are options available for implementing some embodiment of the invented method for a database having none. In one embodiment, the database might have some identifiers, but they aren't unique. The invented method responds by either ignoring the duplicates and working around them, or by simply truncating and copying the entire database. As an additional option, a database management system incorporating new data into a database such that an identifier that was previously unique now includes duplicates, might alert a user or administrator that modification of either settings or data is necessary to ensure unique identification within the relevant database.

Second, certain preferred embodiments of the present invention require that each source database record SRC.RCD.001-N and target database record TGT.RCD.001-N include also a date time stamp field or "DTS" field 406 which contains a date time stamp 408 corresponding to a temporal point at which the associated record was last modified, such that if the DTS 408 associated with any given source database record SRC.RCD.X corresponds to a date or time prior to that corresponding with the DTS 408 associated with any given target database record TGT.RCD.X, it can be determined that the source database record SRC.RCD.X was modified before the target database record TGT.RCD.X was modified. In FIG. 4A the placeholder for the DTS 408 is DTS.001, and in FIG. 4B, the example DTS 408 shown is 1/1/19, representing Jan. 1, 2019, the hypothetical date on which this exemplary database record RCD.X was last modified. It is understood that a date time stamp 408 may be of any format suitable for storing a date and/or time, and may also be of any level of granularity with regard to encoding a particular date and time. The examples herein save complexity by presenting date values only, to show one DTS 408 as preceding another, but one understands that a real-world embodiment is likely to keep track of update times to the minute or second the entry was updated, not only the date.

In certain embodiments, the DTS 408 is unnecessary. One basic aim of the invented method is efficient repair of a target database 108 that was damaged or went offline, from an undamaged source database 104. If there is a target server 106 record as to when the error occurred on the target server 106, and a source server 102 log of updates, the target server 106 might simply request that the source server 102 send over copies of all source database records SRC.RCD.001-N that have been updated since the crash or perhaps shortly before, or check for damaged target database records TGT.RCD.001-N and request fresh copies of just those. In a case like this, the individual records SRC.RCD.001-N and TGT.RCD.001-N need not each have their own 'last modified' timestamps, though one recognizes that inclusion of these is generally a good policy in data management and doing so permits a higher level of functionality enacting the invented method.

It is noted also that, aside from the unique key field 402 and DTS field 406, the other fields included in the records of the databases 104 and 108 employing the invented method may be or comprise anything, and it is irrelevant to the invented method what or how many the other data fields 410 besides the unique key field 402 and DTS field 406 might be. In the present description, the one or more other data fields 410 that may be included in the database records SRC.RCD.001-N and TGT-RCD.001-N and databases 102 and 106 operated upon using the present invented method are collectively represented in these Figures by an 'other data' field 410 containing some other data 412. In FIG. 4A, the placeholder for the other data is DATA.001, and in FIG. 4B, the example other data 412 is a char string containing a color, "red". All source and target database records SRC.RCD.001-N and TGT.RCD.001-N as presented herein are understood as being instances of a record RCD.X comprising fields 402, 406, and 410 for a unique key 404, a DTS 408, and other data 412, as presented and established in FIG. 4.

Referring now generally to the Figures and particularly to FIG. 5, FIG. 5 is a table representing an example possible embodiment of the source database 104 including several example source database records SRC.RCD.001-009 as previously presented in FIGS. 2 and 4. It is understood that the source database 104 may comprise or include any number of source database records SRC.RCD.001-N or additional data fields 410, and the hypothetical example tables and example data values 404, 408, and 412 used for explanatory purposes in these Figures represent only a small-scale demonstration of the application of the invented method. In the example source database 104 table presented in FIG. 5, columns A, B, and C of the table as shown represent the data fields 402, 406, and 410 respectively of the stored records as labeled in a header row 1, and rows 2-8 of the table represent a plurality of example records SRC.RCD.001-009 included in the presented example source database 104, each example record SRC.RCD.001-009 including example values for the unique key 404, DTS 408, and other data 412 of each record SRC.RCD.001-009, as displayed in columns A, B, and C respectively and as labeled in the header row 1. For instance, row 5 in this example of the source database 102 represents a record SRC.RCD.001-009 in the source database 104 in which the unique key 404 is the value 005, the DTS 408 is Feb. 2, 2019, and the other data field 410 contains "blue". The table reading and formatting convention established in FIG. 5 is understood to apply to all subsequent Figures.

Figure 6:
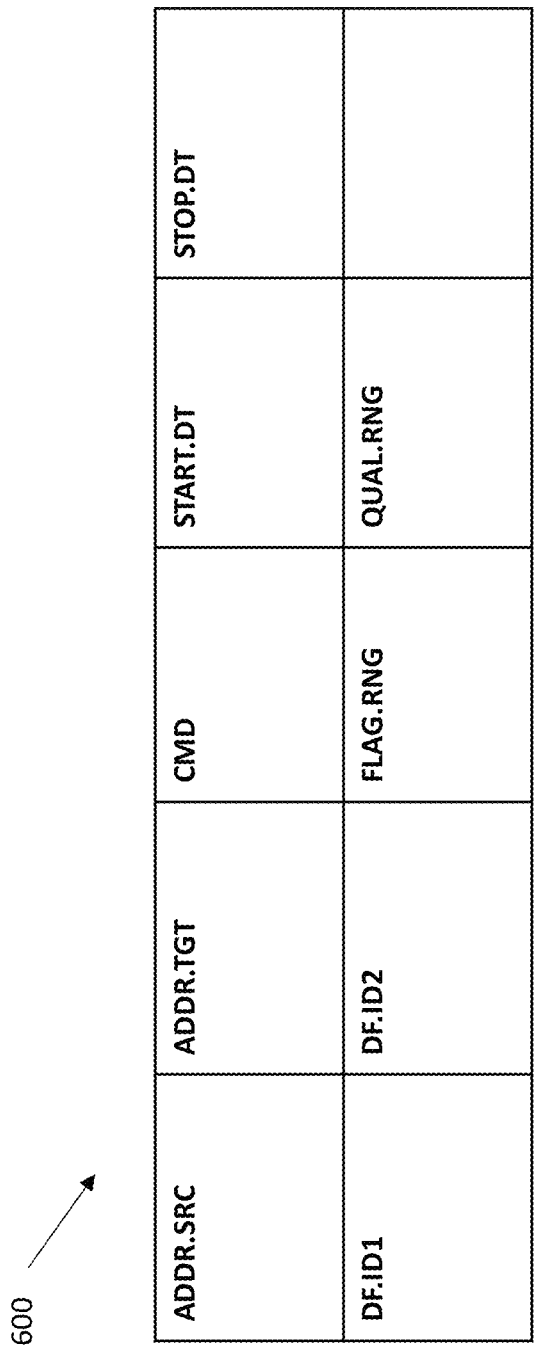
FIG. 6 is a block diagram representing a download request such as may be generated by the target server to request either a key/DTS roster or full database records in applying the invented method.

Referring now generally to the Figures and particularly to FIG. 6, FIG. 6 is a block diagram of a download request 600. This may be a message sent from the target server 106 to the source server 102 such as a key/DTS roster request 700 or a request list 704 as each presented in FIG. 7A-7G. A command field CMD is included as that which specifies, in the case of the invented method, that what is requested is a download, and not any other operation this server may be requested to perform by some other unrelated process. Any such download request 600 should optimally contain or include a sending address ADDR.SRC such that the download request 600 successfully reaches the intended recipient such as the source server 102; such a sending address ADDR.SRC may include a username, an IP address, a port number, a file path, and/or any other relevant network location information, or any other means known in the art for specifying a network location to which data should be transmitted. Additionally, a download request 600 may contain or include a return address ADDR.TGT such that the source server 102 is able to send the record data requested by the download request 600 back to the party that made the request, such as the target server 106; such a return address ADDR.TGT may include a username, an IP address, a port number, a file path, and/or any other relevant network location information, and may be included in or include an SSH command line or any other means known in the art for specifying a network location to which data should be transmitted. The download request 600 specifies which data fields DF.1 and DF.2 are being requested from each record; for a key/DTS roster request 700 as presented in FIG. 7, these values will specify the one unique key field 402 or multiple unique key fields 402 and the DTS field 406; if the download request 600 is for whole records instead, these fields will specify that. A flag FLAG.RNG might specify whether all records are being requested or a subset. If all are being requested, the remaining fields are ignored; else, the START.DT and STOP.DT fields may indicate a beginning point and end point for specifying a range of records, and the QUAL.RNG field may specify a search criterium that can define or further limit a subset, e.g. "last name field starts with L" or "DTS 404 is after 1/1/2019". It is understood that the unique key 404 need not be an ID number or single field, and could be set up as a combination or conjunction of multiple fields, e.g. title and author, as discussed earlier regarding unique keys 404. It should be noted that the DTS field 406 is useful to see if the record has changed without comparing the values of each and every field 402, 406, and 410 in each and every record SRC.RCD001-N and TGT.RCD.001-N in the databases 104 and 108. Having timestamps or using them this way isn't a required aspect of the invented method, but certainly preferred.

Referring now generally to the Figures, and particularly to FIGS. 7A through 7G, FIGS. 7A through 7G comprise a step-by-step example with example data values, in which the set of example target database records TGT.RCD.001-008 contained in an example of the target database 108 of the target server 106 are updated with example source database records SRC.RCD.001-009 from a corresponding example of the source database 104 of the source server 102 by means of and according to the method of a preferred embodiment of the present invention.

Figure 7A:
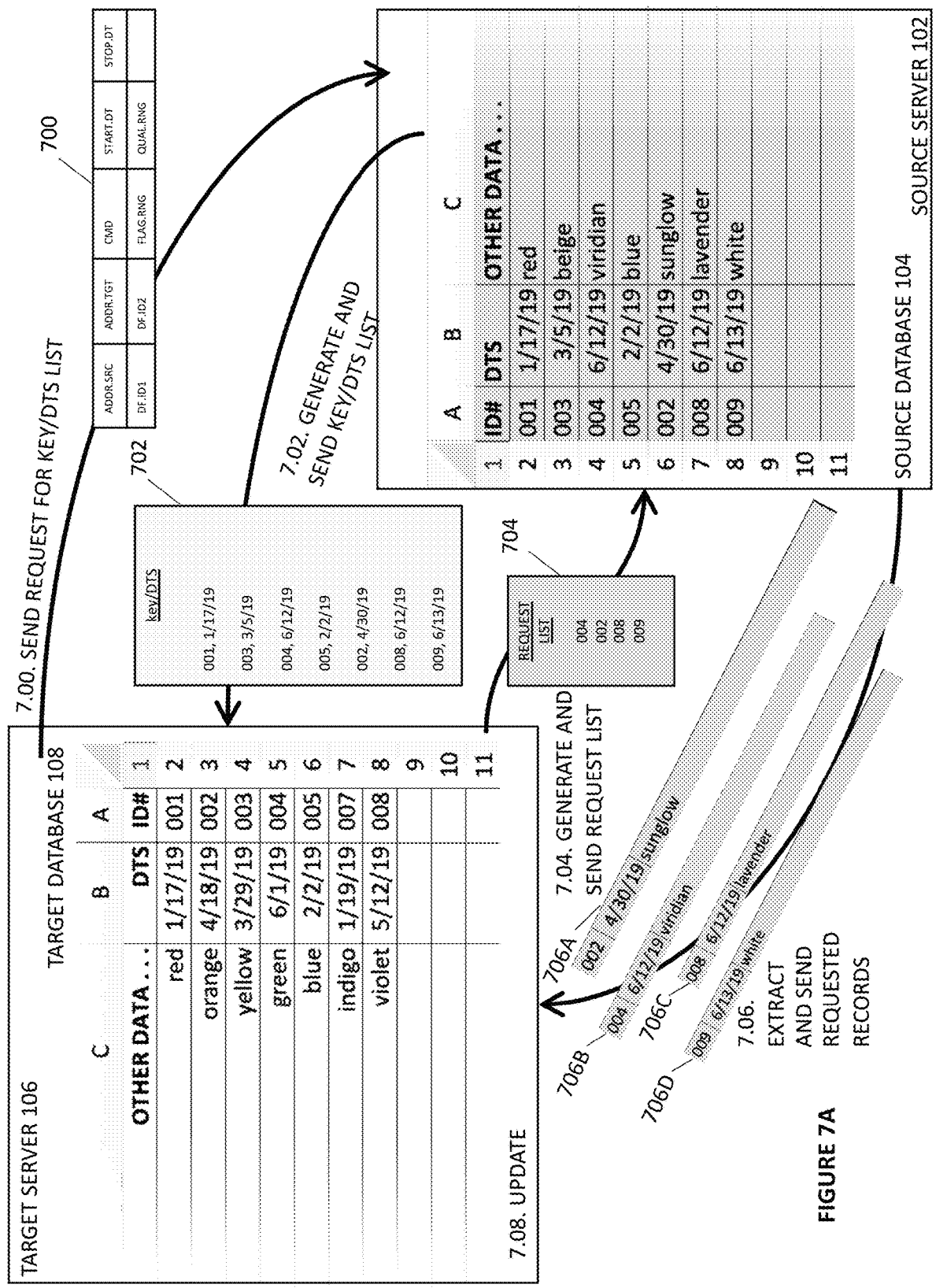
FIG. 7A is an overview of a step-by-step example of a preferred embodiment of the invented method presented further in FIGS. 7B-7G and presenting communication transactions occurring between the example target server and database and the example source server and database.

Referring now generally to the Figures and particularly to FIG. 7A, FIG. 7A is an overview chart showing both sides of the communicative transaction between the source server 102 and source database 104, and the target server 106 and target database 108, including what items are being sent back and forth and in what order, to enact a preferred embodiment of the invented method. Note that the process presented in broad overview in FIG. 7A is also subsequently presented step-by-step in FIGS. 7B through 7G, and those Figures may be referred to for further detail on aspects of the material presented introductorily as a 'map' in FIG. 7A. Further, note that the example in FIGS. 7A through 7G presents the image of the target database 108 as 'mirroring' the image of the source database 104, with the unique key data field 402 in each table visually closest to the center of the diagram. This visual presentation is intended to allow continuity between steps of the example operation in FIGS. 7A-7G by consistently presenting the target server 106 as spatially located toward the viewer's left and the source server 102 as spatially located toward the viewer's right, having the 'target server 106 side' of the operation always appear leftmost in the diagram and the 'source server 102 side' always rightmost, with the unique keys 404 in each database pointing in toward the center for interaction and comparison with elements 'coming from the opposite side'. Additionally, this visual presentation is intended, along with use of shading, to counter a natural tendency to mix up which database image is which, when the two might otherwise appear very similar, and thus improve clarity for the reader. In step 7.00 the target server 106 sends a key/DTS roster request 700 to the source server 102 asking for a key/DTS roster 702, which can be a list or table containing a paired unique key 404 and date time stamp 408 for each record listed in the source database 104 that fits the query, as presented and discussed in FIG. 6. In step 7.02, the source database 104 generates the requested key/DTS roster 702 and sends the key/DTS roster 702 back to the target server 106. In step 7.04, the target server 106 uses the key/DTS roster 702 to generate a request list 704 with reference to the target database 108, containing the unique keys 404 of the source database records SRC.RCD.001-N selected for download in order to update the target database 108. In step 7.06, the source server 102 extracts each of the selected source database records 706A-D whose unique keys 404 are listed on the request list 704 from the source database 104 and transmits the selected source database records 706A-D to the target server 106. In step 7.08, the target database 108 is updated with the selected source database records 706A-D transmitted from the source server 102, and the process is complete.

Figure 7B:
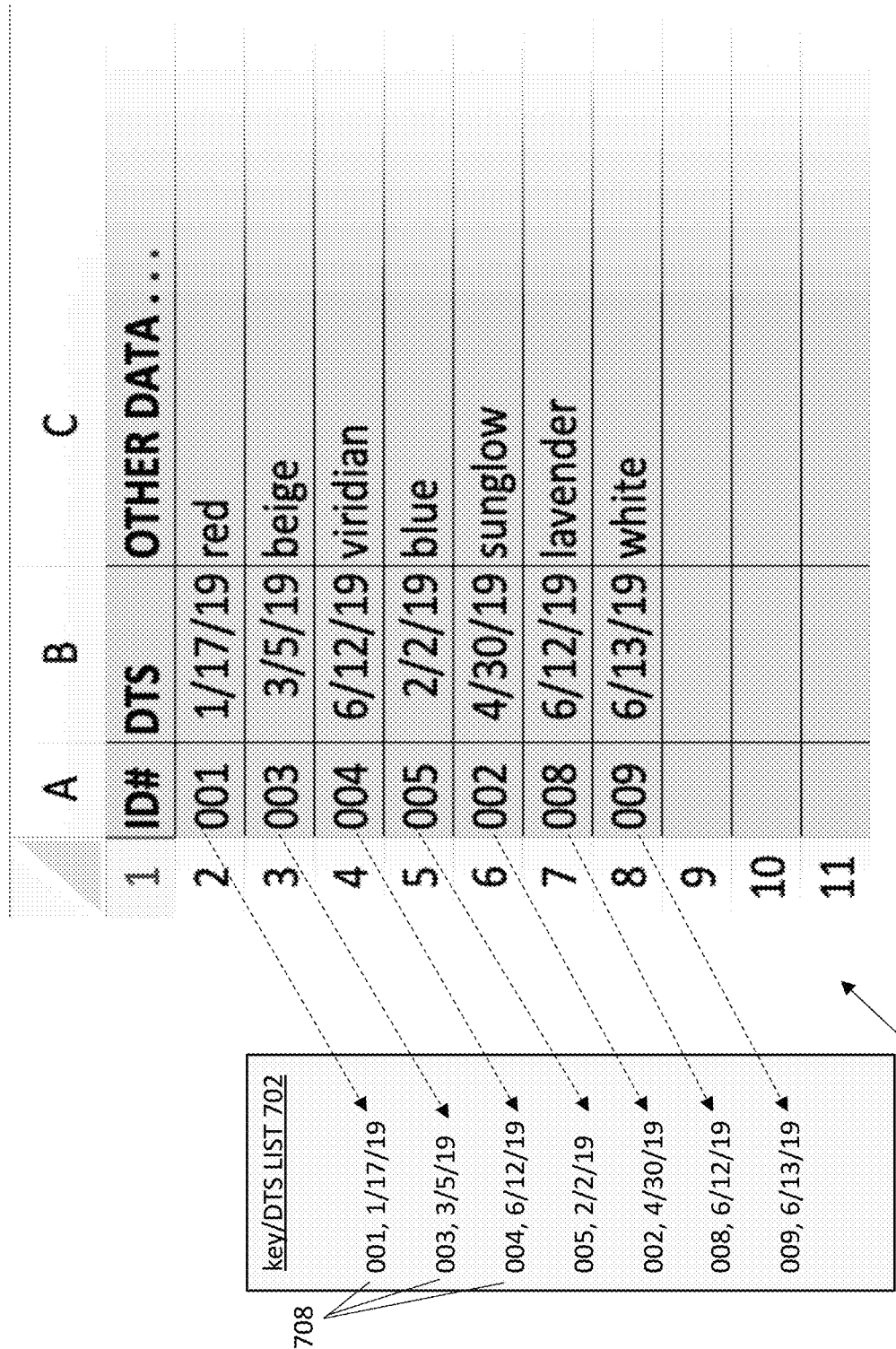
FIG. 7B is a diagram presenting step 7.02 of the example presented in FIGS. 7A-7G, in which an example key/DTS Roster is generated from the example source database.

Referring now generally to the Figures and particularly to FIG. 7B, FIG. 7B is a block diagram showing detail of step 7.02 of the database update example of FIGS. 7A through 7G, in which the source server 102 uses the source database 104 to generate the key/DTS roster 702. Note how each entry 708 in the key/DTS roster 702 consists of a set of paired values: the unique key 404 and DTS 408 of the source database record SRC.RCD.001-N to which the entry corresponds. The unique key 404 with the value 002 being out of numerical order relative to the other unique keys 404 herein is intentional, to demonstrate a point throughout; note that the ordering of records within the databases 102 and 106 doesn't matter in implementation of the present method. Once the key/DTS roster 702 is generated, the key/DTS roster 702 is sent to the target server 106 as shown by the arrow in FIG. 7A.

It is understood that the key/DTS roster 702 may be or comprise the formatted results of a focused query of the source database 104 that requests only the unique key 404 and DTS 408 fields of each record, or the same content stored and transmitted in any file format or data structure capable of storing a plurality of paired values, including for example a text file in comma-separated value format, which has the file extension *.csv, or a two-dimensional array as defined in software code. Note also that the query need not pertain to the whole source database 104; should it be preferred, one could configure the target server 106 to select any subset of records that can be defined by a database query as known in the art, such as "A through L" or "unique key numbers 100 through 300", to request, and the same method could be used to update only the records within that partial subset. However, it should also be noted that if the entire database is not queried, the database update's ability to check for new deletions is limited. Additionally noted is the advantage that the key/DTS roster 702 need not and ideally should not be a large or difficult-to-download file or files; this data is for preliminary 'planning', so the target server 106 can select, download, and update only those target database records TGT.RCD.001-N in the target database 108 that have been modified in the source database 104, without the bandwidth-heavy necessity of downloading all of the source database records SRC.RCD.001-N every time. In the present example, the key/DTS roster 702 is displayed as a series of comma-separated pairs, as might be contained in a text semaphore transmitting this information; the key/DTS roster 702 may be as simple a file as that, or any means for storing and transmitting several sets of paired values that is known in the art.

Figure 7C:
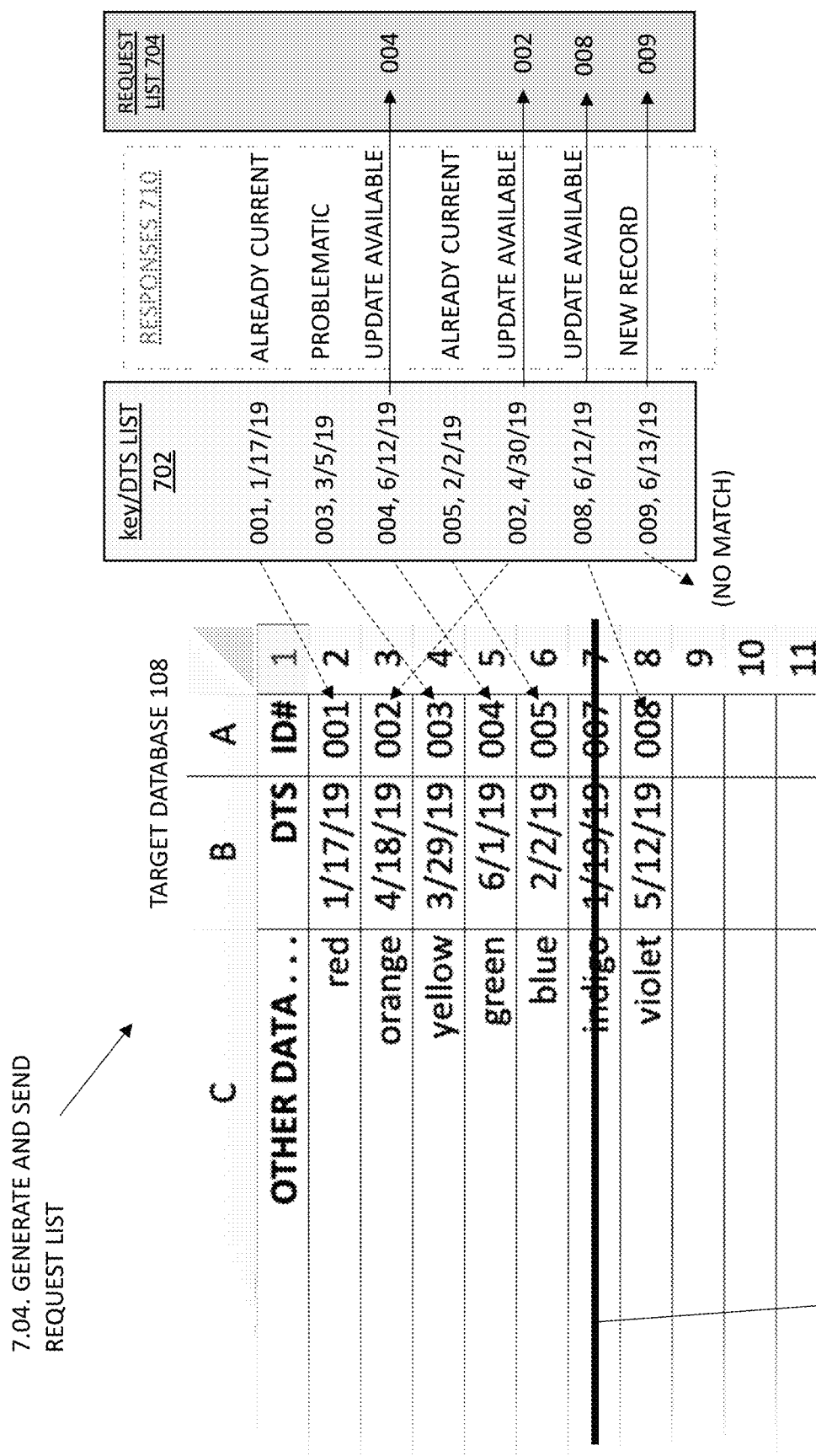
FIG. 7C is a diagram presenting step 7.04 of the example presented in FIGS. 7A-7G, in which the example key/DTS Roster is compared to the example target database and used to generate an example request list for records to download.
Figure 8:
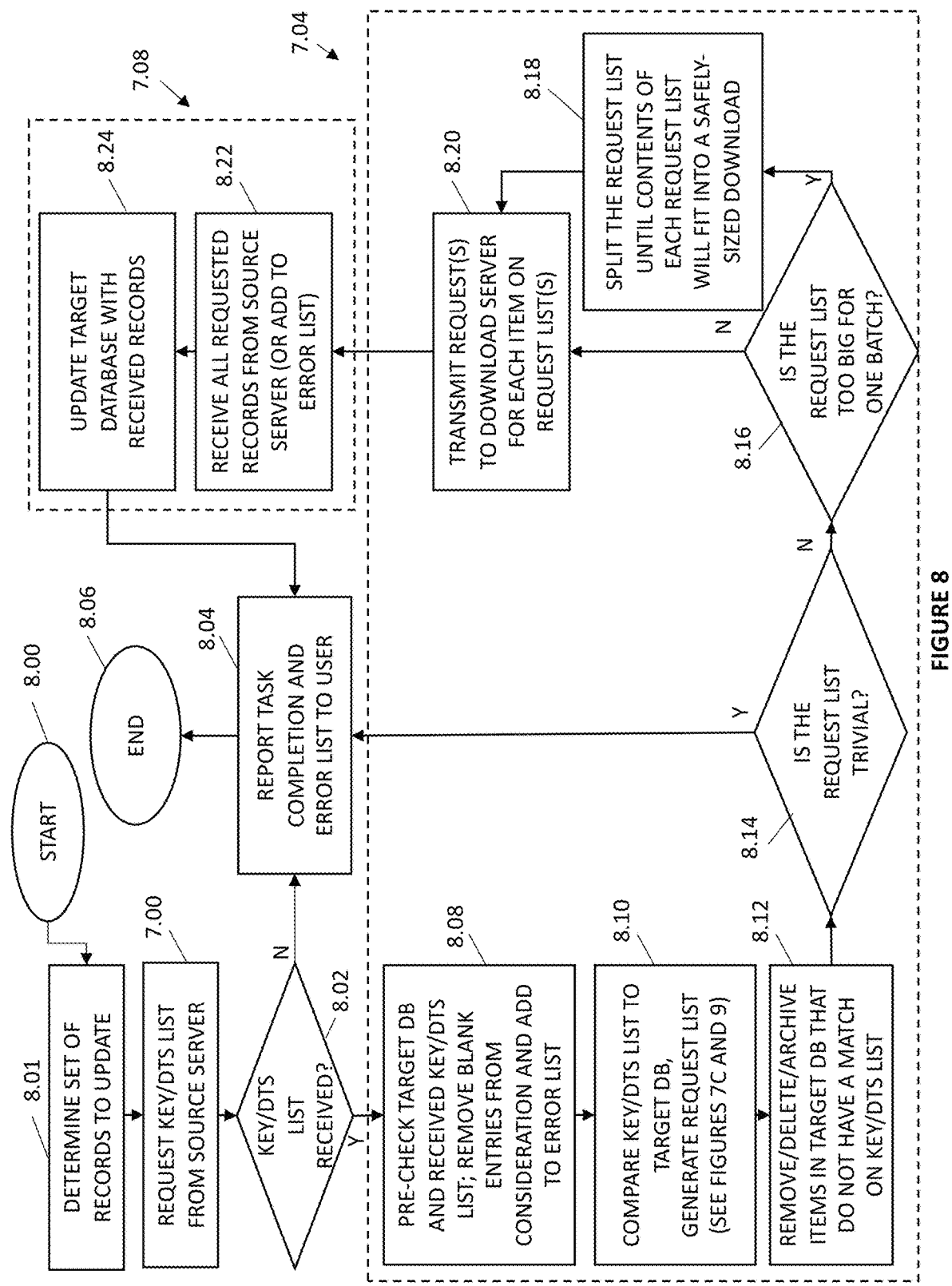
FIG. 8 is a flow chart of a preferred embodiment of the invented method whereby the target server requests and uses a key/DTS Roster to determine which records should be downloaded from the source server, and downloads those selected records.

Referring now generally to the Figures and particularly to FIG. 7C, FIG. 7C is a block diagram showing detail of step 7.04 continuing the database update example of FIGS. 7A through 7G, in which the target server 106 compares the key/DTS roster 702 generated in step 7.02 to the records locally contained in the target database 108, and produces the request list 704 to be sent to the source server 102. Additionally included for the purpose of a clear and easy-to-follow example is a list of responses 710 that indicate the result of each comparison and the logic behind including the unique key 404 of that entry 708 on the request list 704 or not. The first entry 708 in the key/DTS roster 702, "001, 1/17/19", is matched to the target database record TGT.RCD.001 in the target database 108 with the same unique key 404 which has the value 001, is located in row 2, has the example DTS 408 with the value "1/17/19" and has the example other data 410 that reads "red"; since the two DTS values match, the target server 106 determines that the 001 record in the target database 108 is "ALREADY CURRENT" as indicated in the responses 710, and 001 is not included in the set of unique keys 404 the target server 106 requests to download to update the target database 108; the rest of the comparisons follow this same pattern. Note that the request list 704 is composed by mapping each key/DTS roster 702 entry 708 to a matching target database record TGT.RCD.001-N, not vice versa—if a key/DTS roster 702 entry 708 has no corresponding target database record TGT.RCD.001-N, as is the case with 009, it is added to the request list 704 because this is a new source database record SRC.RCD.009 that the source database 104 contains and of which the target database 108 doesn't have a corresponding copy. However and conversely, if a target database record TGT.RCD.001-N has no corresponding key/DTS roster 702 entry, as in the case of record 007 as listed here, the target database record TGT.RCD.007 should be ignored in generating the request list 704, and removed from the target database 108 by means such as archiving or deleting, as indicated here with a strikethrough 712. The finished request list 704 includes, in addition to TGT.RCD.009 as mentioned, target database records TGT.RCD.004, TGT.RCD.002, and TGT.RCD.008 because the corresponding DTS 408 on the key/DTS roster 702 postdates the DTS 408 stored in the target database 108, indicating that the corresponding source database record SRC.RCD.001-N stored in the source database 104 has been modified and the target database 108 should be updated accordingly. Further, note that target database record TGT.RCD.003 in the target database has a DTS 408 taking place after the DTS 408 of the key/DTS roster, indicating that the target database record TGT.RCD.003 has been modified locally on the target server 106 more recently than the source database record SRC.RCD.003 has been modified on the source server 102. Since it's the case that the present method is directed to an embodiment in which: (a.) all updates come unidirectionally from the source server 102, (b.) the target server 106 only receives updates and never provides updates, what is presented as the data for 003 shouldn't happen but might indicate an error. This might be classified as an instance of problematic data and reported to the user, as shown later on in the flowchart of FIG. 8, and one merely notes here an instance as possible data; for the purposes of generating the current request list 704, the anomalous and potentially damaged record is properly ignored. In other implementations of the invented method, particularly those with the aim of repairing a damaged database, target database record TGT.RCD.003 having this anomalous data might be taken as indication enough that target database record TGT.RCD.003 has been damaged somehow and should be deleted and replaced; in this case, "003" would be added to the request list 704 and the present target database record TGT.RCD.003 marked for deletion. Note also the instance of a unique key 404 with the value 007 that is present in the target database 108 and not present on the key/DTS roster 702; this is a source database record SRC.RCD.007 that has been removed from the source database 104 since the last update, and in updating the target database 108, target database record TGT.RCD.007 should also be removed by means such as deleting or archiving as appropriate. This step, local to the target server 106, is shown in the flowchart of FIG. 8, and one merely notes an instance of such a case as mentioned by the present example as possible example data. Note also that the request list 704 is even smaller than the key/DTS roster 702, containing only the unique keys 404, and the unique keys 404 of the request list 704 corresponding to a subset of the entries 708 originally included on the key/DTS roster 702. Once the target server 106 has determined here which subset of source database records SRC.RCD.001-N should be downloaded, the unique keys 404 are all the information necessary to request that the source server 102 send over each of the source database records SRC.RCD.001 that the target server 106 has determined are required for updating the target database 108. Finally, note that the unique key 404 with the value 002 being out of numerical order on the key/DTS roster 702 doesn't matter in this step either, as the key/DTS roster 702 entries 708 are matched to target database records TGT.RCD.001-N by matching unique keys 404. The order on the key/DTS roster 702 may even propagate over to the order of the items on the request list 704, but of course, the order in which individual items are requested for download is also irrelevant except perhaps as to which files the user would like to be able to access first, which wouldn't necessarily be in numerical order anyway.

Referring now generally to the Figures and particularly to FIGS. 7D and 7E, FIGS. 7D and 7E are block diagrams showing detail of step 7.06 and continuing the database update example of FIGS. 7A through 7G, in which the source server 102 uses the request list 704 sent over by the target server 106 to extract the indicated source database records SRC.RCD.001-N as a set of selected records 706A-D to be sent over as requested by the target server 106, and then send the files over. FIG. 7D presents each unique key 404 on the request list 704 being matched to a source database record SRC.RCD.001-N in the source database 108, and FIG. 7E shows the four selected records 706A-D being copied, exported, or extracted from the source database 104 to be transmitted to the target server 106 as whole records RCD.001-N, including the other data field 410 that represents everything that may be included in a whole record RCD.001-N other than the unique key 404 and DTS 408. It is understood that the selected records 706A-706D are referenced throughout as referring to any set of whole records selected and requested to be downloaded from the source database 104 to the target database 108, even a set comprising more or fewer than four records as presented here.

It should be noted that, up until this point, not one whole database record RCD.001-N has been transferred between the target server 106 and the source server 102, and now only the selected records 706A-D that have already been specifically selected as necessary are being transmitted; that's a huge savings in efficient bandwidth usage and download speed, especially over downloading every source database record SRC.RCD.001-N every time from the source database 104 to overwrite the target database 108 just in case anything has changed.

It is generally known in the art that even a single whole database record RCD.001-N can be very large; a real database's records might have dozens of other data fields 410 in place of this example's placeholder other data field 410 as a token representation standing in for 'everything else', whatever that 'everything else' may include. From just this example, it may not be obvious what a benefit it is to avoid transferring or downloading whole records unnecessarily; one should perhaps imagine that the color names in the example each represent a data package that takes at least two hours to download, to appreciate the impact of applying the invented method. Understanding this, an easily anticipated benefit of implementation of the invented method is that, regardless of the number of data fields in a database record or the amount of computer memory occupied by the information contained within, which could be substantial as it might include volumes of text, large numbers, even software packages, audio, video, or high-resolution images, the small and simple pieces of data used to represent the whole records RCD.001-N when implementing the invented method a unique key 404 and a DTS 408—remain the same, relatively minuscule and simple size in this representation, allowing even huge and unwieldy databases to be managed and manipulated efficiently.

Referring now generally to the Figures and particularly to FIGS. 7F and 7G, FIGS. 7F and 7G are block diagrams showing detail of step 7.08 and completing the database update example of FIGS. 7A through 7G, in which the whole records 706A-D extracted from the source database 104 and sent by the source server 102 to the target server 106 are used by the target server 106 to update the target database 108. FIG. 7F shows the four sent records 706A-D of the example each matched to the corresponding older target database records TGT.RCD.001-N present in the target database bearing the same unique key 404, and FIG. 7G shows the target database 108 having been updated, with the information contained in the new records 706A-D replacing the data previously stored in the database records bearing the same unique keys 404. The newly-updated records are shaded in, for visual clarity, and the removal of target database record TGT.RCD.007 is still indicated by means of strikethrough 712 as noted previously.

It is understood and emphasized that the example of FIGS. 7A through 7G represents a trivially small example of the invented method as applied to databases full of example data values, and is intended only for purposes of explaining the invented method. The example values or formats for depicting and showing data are not meant to be limiting or teaching as to data formatting. Those skilled in the art will recognize that the data and data table formats presented in this example are single possibilities out of several that can be used to encode or represent any relevant information as included in a database of any structure known in the art.

Referring now generally to the Figures, and particularly to FIG. 8, FIG. 8 is a flowchart of a preferred embodiment of the invented method whereby the target server 106 requests and uses the key/DTS roster 702 to determine which source server records SRC.RCD.001-N should be downloaded from the source server 102, requests the selected records 706A-D by generating and sending the request list 704, receives the selected records 706A-D, and uses the selected records 706A-D to update the target database 108.

In step 8.00, the process begins. In step 8.01 the set of target database records TGT.RCD.001-N is selected to be updated. As mentioned earlier, this might be a command to update the entire target database 108, or a selection of a subset of records to update, such as 'A through L' or 'everything from this year'. This would be where values such as START.DT, STOP.DT, DF.ID1, DF.ID2, FLAG.RNG, and QUAL.RNG of the message 600 are set, if the current task is using these to limit the scope of the request. This selection might be performed by a user, encoded as an automated or scripted command, or be dictated by any other means known in the art for directing a computer to initiate a task and setting the parameters of that task. In the next step of this process, which is the same as step 7.00 in FIG. 7A, the target server 106 transmits a key/DTS roster request 700 to the source server 102, wherein the data range selected in step 8.01 is requested and the data requested includes a key/DTS roster 702, which is a list or table containing a paired unique key 404 and date time stamp 408 for each record listed in the source database 104 that matches the key/DTS roster request 700. It is understood that the key/DTS roster 702 may be or comprise the results of a focused query of the source database 104 that requests only the unique key field 402 and DTS field 406 of each matching record, or the same content stored and transmitted in any file format or data structure capable of storing a plurality of paired values, including for example a text file in comma-separated value format or *.csv, or a two-dimensional array as defined in software code. The key/DTS roster request 700 may be a request for the unique key 404 and DTS 408 of all source database records SRC.RCD.001-N in the source database 104, or any subset thereof. Additionally noted is the advantage that the key/DTS roster 702 need not be a large or difficult-to-download file or files, and in ideal embodiments shouldn't be; this data is for preliminary 'planning', so the target server 106 can select, download, and update only those target database records TGT.RCD.001-N that actually require updating, without the bandwidth-heavy necessity of downloading all of the source database records SRC.RCD.001-N every time just in case.

Having requested a key/DTS roster 702 from the source server 102, the target server 106 then receives the key/DTS roster 702 that was requested, in order to continue with the invented method, and checks in step 8.02 whether the key/DTS roster 702 was received. If the source server 102 fails to provide the key/DTS roster 702, perhaps having been given a set length of time in which to plausibly provide the requested information, the target server 106 may report back to a user or initiating automation in step 8.04 that the process is over, and what the results are. In this instance, the results are that the process timed out, nothing was downloaded and no records were changed, because the source server failed to provide the requested key/DTS roster and might be either offline or not functioning properly. This is an obvious measure known in the art to prevent a computer engaged in a two-sided 'handshake' operation from simply waiting forever if the computer on the other side of the exchange is inaccessible or offline. It should be understood that such commonsense measures are good general practices, but not entirely compulsory; an embodiment of the invented method with no commonsense error handling measures built in might be a bad idea, but of course what constitutes common sense versus overcaution in the domain of computer programming is bound to change in the future or depending upon the computing platform executing the invented method. Statement of aspects of the best execution of the invented method as currently known, including at least some common sense error-proofing as currently known in the art, should not be construed as limitation that excludes embodiments implemented with poorer programming practices or less error-proofing, or limitation that excludes embodiments that follow additional good programming practices known in the art that are not mentioned herein. The process ends in step 8.06.

In the more optimal case, which is assumed to be the case in FIGS. 7A through 7G, the source server 102 does in fact provide the key/DTS roster 702 requested by the target server 106, the process continues to step 8.08, in which the target server 106 performs a preliminary check to prevent parsing errors and undefined behavior. Every pair in the key/DTS roster 702 should contain both fields 402 and 406—a unique key 404 and a DTS 408—encoded in a compatible format that the target server software 106H performing the invented method can parse and compare to the target database 108 to perform the invented method. Similarly, in this embodiment of the invented method all records in the target database 108 are expected to have both a unique key 404 and a DTS 408 to be safely included in the comparison operation. Anything else, such as a record with no DTS 408, or a file sent as key/DTS roster 702 that is full of gibberish, may be added to a log of errors supplied to a user at the end of the process, and the problematic material removed or ignored, to prevent undefined behavior in the comparison step 8.10. Having performed step 8.08, we are assured that the paired values of the key/DTS roster 702 can be compared safely with the unique key and DTS data fields in the target database 108, without any danger of encountering input that can cause undefined behavior or a system problem such as a segmentation fault. Again, it should be noted that failure to include double-checking steps to prevent undefined behavior wouldn't be a problem in an ideal situation where the data input was always perfect; inclusion of good programming practices in exemplary embodiments of implementation of the invented method should not be construed as limitation that excludes bad code design that follows the same method if able.

In step 8.10, the contents of the key/DTS roster 702 are compared to the target database records TGT.RCD.001-N in the target database 108 to generate a request list 704 of unique keys 404, whereby each unique key 404 on the request list 704 corresponds to an entry 708 on the key/DTS roster 702 that was either not matched to any record in the target database 108, which signifies that a new record present in the source database 104 and not in the target database 108; or was matched to a target database record TGT.RCD.001-N in the target database 108 whose DTS 408 is earlier than the DTS 408 attached to the same unique key 404 on the key/DTS roster 702 as received from the source server 102, which signifies that there is an updated source database record SRC.RCD.001-N in the source database 104 available for download from the source server 102. Further detail on a more individual scale regarding this comparison process is presented additionally in FIG. 7C and FIG. 9.

In step 8.12, the target server 106 determines which target database records TGT.RCD.001-N in the target database 108 have no corresponding entry in the key/DTS roster 702 and removes these from the target database 108 such as by archiving or deleting the target database records TGT.RCD.001-N; these records are not present in the source database 104, and should accordingly be removed from the target database 108 also. This database-updating step was indicated also in FIG. 7C with strikethrough 712.

In step 8.14, the request list 704 is, as an option that might generally be a good idea in an ideal embodiment, checked for being directed toward a download that is trivial, such as a list containing 0 items, meaning the database is already up-to-date, or perhaps containing only items that are out of date by five minutes or less and therefore not 'worth' an update yet. The threshold for determining what is trivial would be user-predefined, to allow for optimization between up-to-the-moment information and sensible bandwidth usage. If the target server software 106H determines that the update represented by the generated request list 704 is trivial, this result may be reported to the user in step 8.04 and the process ends in step 8.06. Otherwise, the process proceeds to step 8.16, in which the request list 704 may be checked for being directed toward a download that is too large for one batch. If so, the request list 704 may be split into multiple download requests in step 8.18 before the request list 704 or all of the multiple request lists 704 are sent to the source server 102 in step 8.20. Naturally, the source server 102 might also or alternatively manage such limitations, receiving a download request and delivering the requested files in installments if capacity limitations necessitate this. In step 8.22, the target server 106 receives one or more selected records 706A-D from the source server 102. If any of the records RCD.001-N requested as unique keys 404 on the request list 704 are not present, this is an error that might be noted in an error log for a user to resolve. In step 8.24 the target server 106 uses the selected records 706A-D received from the source server 102 to update the corresponding target database records TGT.RCD.001-N in the target database 108. It is additionally noted that steps 8.08 through 8.20 on this flowchart are more granular details within step 7.04 as presented in FIGS. 7A through 7G, and steps 8.22-8.24 are more granular details within step 7.08 as presented in FIGS. 7A through 7G.

Figure 9:
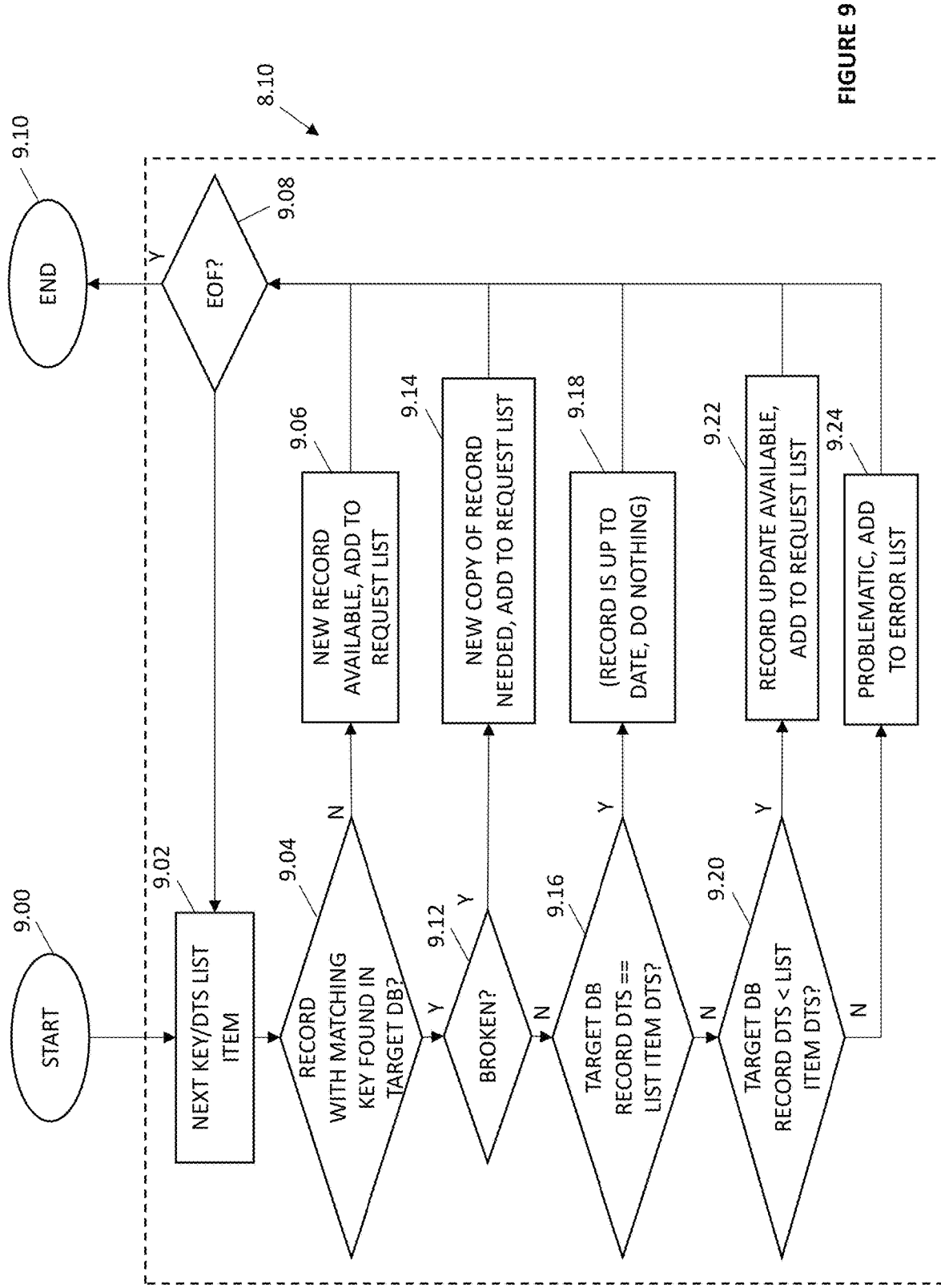
FIG. 9 is a flow chart of a preferred embodiment of the invented method presenting the record selection step of the target server of FIG. 8 in further detail.

Referring now generally to the Figures, and particularly to FIG. 9, FIG. 9 is a flowchart presenting further detail regarding the comparison between entries 708 on the key/DTS roster 702 and target database records TGT.RCD.001-N in the target database 108 as shown differently with example data in FIG. 7C and mentioned in FIGS. 7A and 8. FIG. 9 presents the comparison process as a loop beginning at step 9.00, in which each entry 708 of the key/DTS roster 702 is in turn selected at step 9.02. In step 9.04, if a target database record TGT.RCD.001-N in the target database 108 with a matching unique key 404 is not found, it is determined that, proceeding to step 9.06, this current entry 708 in the key/DTS roster 702 represents a new source database record SRC.RCD.001-N present in the source database 104 and not in the target database 108, and should be included as one of the unique keys 404 in the request list 704. Continuing to step 9.08, if this is the last entry 708 on the key/DTS roster 702, the loop ends at step 9.10, and else, the next entry 708 on the key/DTS roster 702 is considered next. After matching unique keys 404, in a preferred embodiment as presented in step 9.12 the process checks inasmuch as possible whether the target database record TGT.RCD.001-N in question is broken; for instance, is the data or file corrupted, or is the target database record TGT.RCD.001-N missing any information it shouldn't be? If the system can determine that the local copy of this target database record TGT.RCD.001-N is 'bad' or should be repaired, a new copy should be requested to repair or replace the bad one; if this has been determined, the corresponding unique key 404 is added to the request list 704 in step 9.14. To one skilled in the art, it's obvious why a sanity check of the target database record TGT.RCD.001-N optimally precedes any attempt to access the contents; if the target database record TGT.RCD.001-N has been corrupted, trying to access the target database record TGT.RCD.001-N could cause crashes or undefined behavior, while simply detecting that the target database record TGT.RCD.001-N is corrupted is enough information to know already that the target database record TGT.RCD.001-N should be either replaced or not interacted with. Additionally, it should be noted that, while this reflects good programming practice in general, an implementation of the invented method that fails to include such safeguards in practicing the invented method should be considered only a less ideal embodiment. In step 9.16, the current entry 708 on the key/DTS roster 702 has been matched with the target database record TGT.RCD.001-N in the target database 108 having the same unique key 404, but whether the corresponding source database record SRC.RCD.001-N is being requested has still to be determined. The two DTS 408 values are compared; if these are the same exact value, the target database record TGT.RCD.001-N is up-to-date and the process continues without adding this unique key 404 to the request list 704 or to any error lists, as indicated in step 9.18. In step 9.16, having previously in step 9.04 found the target database record TGT.RCD.001-N matching the current key/DTS entry 708 on the key/DTS roster 702 being considered, and having already determined in step 9.16 that the two corresponding DTS 408 values being compared are not equal, the process now asks whether the DTS 408 in the target database record TGT.RCD.001-N represents an earlier date than that of the corresponding DTS 408 attached to the same unique key 404 on the key/DTS roster 702. If this is the case, as indicated in step 9.22, it's been determined that the source database 104 has an updated version of this target database record TGT.RCD.001-N available, and this unique key 404 should be added to the request list 704. Finally in step 9.24, having determined in steps 9.16 and 9.20 that a target database record TGT.RCD.001-N and a key/DTS roster entry 708 with the same unique key 404 have DTS 408 values such that the DTS 408 on the roster 702 is earlier than the DTS 408 on the target database record TGT.RCD.001-N, this problematic database entry may be mentioned in an error log delivered to a user; this is the case that shouldn't happen in an embodiment wherein updates are unidirectional from the source server 102.

Figures 10A, 10B:
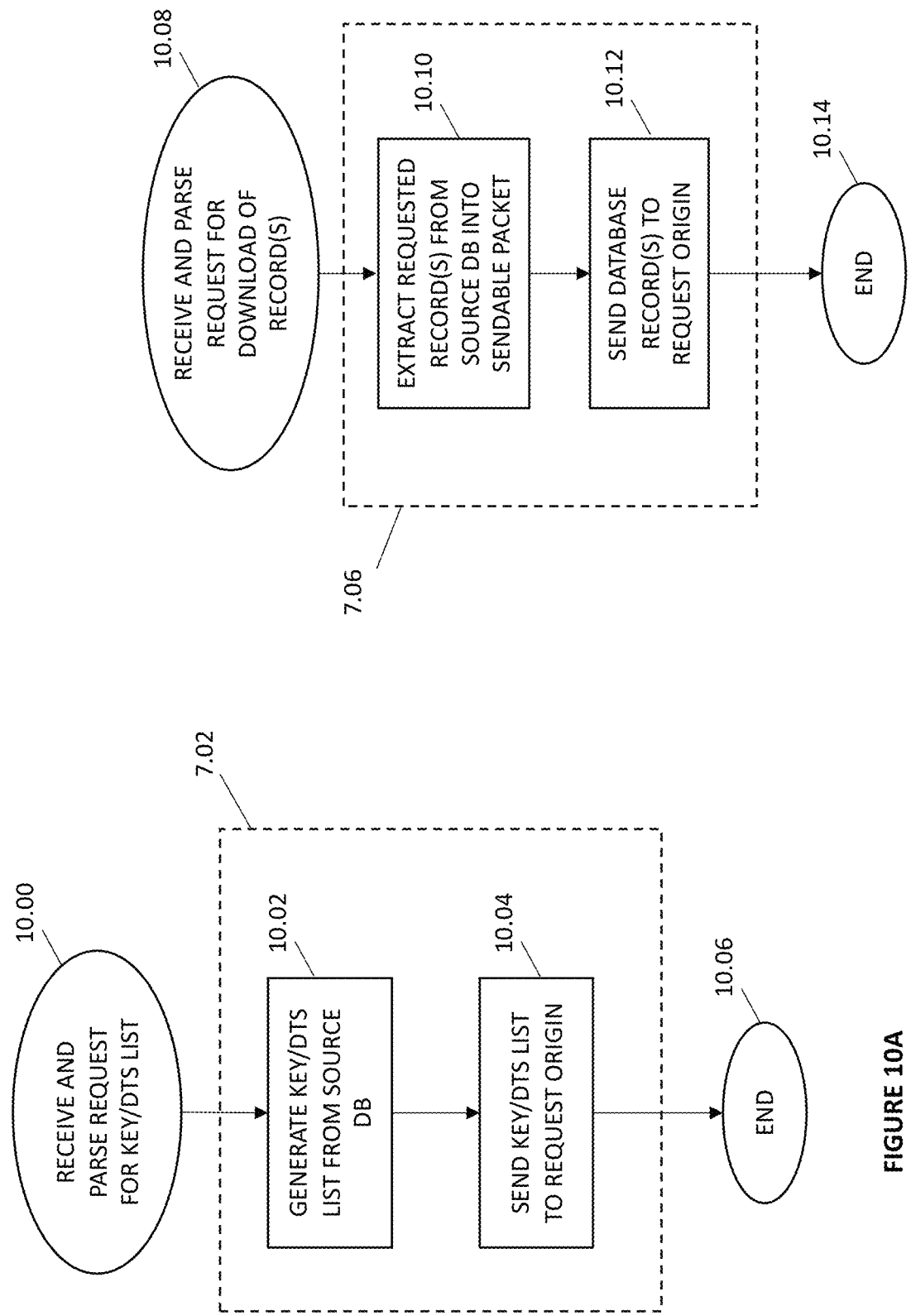
FIGS. 10A, 10B, and 10C are flow charts of a preferred embodiment of the invented method, presenting the process of the flowchart of FIG. 8 from the perspective of the source server.
Figure 10C:
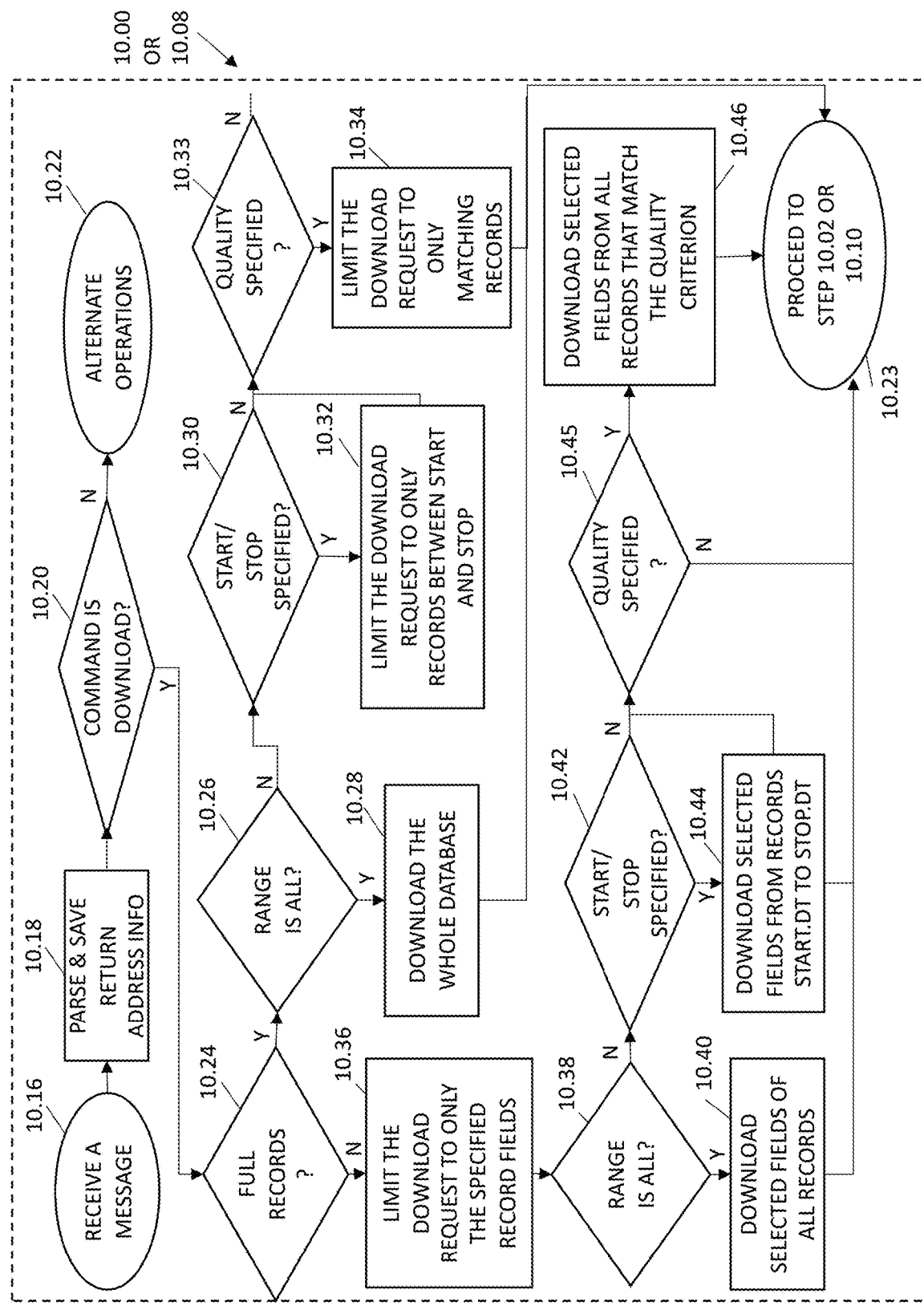

Referring now generally to the Figures, and particularly to FIGS. 10A, 10B, and 10C, FIGS. 10A, 10B, and 10C are flowcharts presenting a preferred embodiment of the invented method as presented in FIG. 8 from the target server 106 side, from the source server 102 side this time. The process starts at step 10.00 when the source server 102 receives the key/DTS roster request 700, which is a download request such that the source server 102 is directed to produce the key/DTS roster 702 and directed to send the generated key/DTS roster 702 to the same party that originated the request, such as the target server 106. A process for parsing the content of a message received by the source server 102 is further outlined in FIG. 10C. In step 10.02 the source server 102 generates the key/DTS roster 702 from the source database 104, and in step 10.04 the source server 102 transmits the key/DTS roster 702 to the request origin, such as the target server 106. Note also that steps 10.02 and 10.04 together correspond to step 7.02 as presented in FIGS. 7A-7G.

The process of FIG. 10B starts at step 10.08 when the source server 102 receives a request for download of one or more source database records SRC.RCD.001-N of source database 104, such as the request list 704. A process for parsing the content of a message received by the source server 102 is further outlined in FIG. 10C. In step 10.10 the source server 102 extracts the selected records 706A-D specified by the request of step 10.08 from source database 104 and performs any requisite operation on the extracted data necessary for sending the selected records 706A-D to the origin of the request, such as saving the data into a compatible file format or packaging or compressing the files being sent into a bundle such as a zip file or *.zip, or a tar ball or *.tar. In step 10.12 the file or files produced in step 10.10 are sent to the party that requested these files from the source server 102 in step 10.08, and in step 10.14 the process ends. Note also that steps 10.10 and 10.12 together correspond to step 7.06 as presented in FIGS. 7A-7G. Additionally note that, from the perspective of the source server 102, the processes of FIGS. 10A and 10B need not be considered connected. The source server 102 merely receives requests and responds to the requests, and need not be 'aware' that the requests received are associated with each other or part of a larger process as shown in FIG. 8.

The process of FIG. 10C is a closer detail of the first steps of the processes presented in FIGS. 10A and 10B, steps 10.00 and 10.08 respectively, wherein a message is received by the source server 102 and parsed. Since this is the parsing step and the received message could be any kind of communication before the source server 102 parses the message, the method of FIG. 10C may be a further detail of either step 10.00 or step 10.08, or in the case of an unrelated message, which also won't be discerned is unrelated until the message is parsed. In step 10.16 the source server 102 receives a message, and in step 10.18 the origin of the message, ADDR.TGT, is stored for later use. At this point, one should note, this message could be anything. It is understood that the source server 102, or any server, may receive many communications, and only certain of these communications are relevant to the invented method. Any other communications to the source server 102 may be perfectly valid in the operation of the source server 102, but are irrelevant to the invented method. Accordingly, in step 10.20, the source server 102 parses the CMD field and checks whether the message being received is a download request 600; if not, in step 10.22 the source server 102 has determined that this is something unrelated to the invented method. At this point, the source server 102 has determined that the invented method is not being used at all, and may deal with the communication being received in whatever manner appropriate and germane to the other functions of the server. It should be noted that even a server that isn't hosting any other services may still receive messages or data packets unrelated to the service being hosted, such as software updates or items pertaining to systems administration; the message that isn't a download request 600 may be one of these, or any other server-related communication known in the art that isn't a database download request 600, and the process of FIG. 10C directs in step 10.22 that the portion of the server to which the message is directed should receive and process the message instead, the invented method no longer 'cares' about this message and the process of FIG. 10C does not proceed any further in parsing this message, nor will it reach step 10.23, which would have the source server 102 continue the process of either FIG. 10A or FIG. 10B; the response to this message viewed from the perspective of implementing the invented method is 'not a valid target'.

Otherwise, the source server 102 has determined that the message is indeed a download request 600; in step 10.24, the source server 102 parses the data fields DF.ID1 and DF.ID2 to determine whether the download request is for whole source database records SRC.RCD.001-N or only for specific data fields 402, 406, and 410 within the source database records SRC.RCD.001-N, such as a key/DTS roster request 700, which asks for only the unique key field 402 and DTS field 406 and not the whole records. If the request is for complete source database records SRC.RCD.001-N, such as in a request list 704, then in step 10.26 the range flag FLAG.RNG is checked; is the request for some of the whole source database records SRC.RCD.001-N, or all of them? If all records are being requested, the source server 102 has determined in step 10.28 that the scope of the download request is the entire source database 104—every whole source database record SRC.RCD.001-N—and the process ends at step 10.23 with the source server 102 having parsed the request and determined how to respond. Otherwise, as of step 10.30 it has been determined that this is a download request, for whole source database records SRC.RCD.001-N, and not all of them; therefore, the method next determines which subset is specified. In step 10.30, the START.DT and STOP.DT fields of the download request 600 are parsed; if these contain a valid starting point and stopping point within the source database 104, then in step 10.32 the download request 600 is limited to the set of source database records SRC.RCD.001-N within the specified section. A download request 600 may be limited by a range specified in START.DT and STOP.DT or quality criteria specified in QUAL.RNG, such as "last names starts with L", so both fields shall be checked and parsed. Regardless of whether there was a range specified, in step 10.33 if there is a quality criterium specified in the QUAL.RNG field of the message, then in step 10.34 the download request is limited or further limited by the specified quality criterium; else the process is complete at step 10.23 with no further limitation. Once the download request 600 for this subset of whole source database records SRC.RCD.001-N has been limited in range, quality, or both, the source server 102 has all of the information needed to respond to the download request 600, and the process ends at step 10.23. It should be noted that if a subset is specified by the FLAG.RNG field but no limitations are included in the START.DT, STOP.DT, or QUAL.RNG fields, the user has defined a subset including all members of the original set, which, while redundant, is still a valid subset as every set is considered a subset of itself. Similarly, it is possible though redundant to have a download request 600 that specifies a subset containing 0 source database records SRC.RCD.001-N, or 0 data fields 402, 406, and/or 410, as the null set is a subset of every set.

If, in step 10.24, the source server 102 determines that the download request 600 is requesting partial source database records SRC.RCD.001-N, not whole source database records SRC.RCD.001-N, the process proceeds to step 10.36, in which the set of source database record SRC.RCD.001-N data being provided is limited to only the data fields 402, 406, and/or 410 specified by the DF.ID1 and DF.ID2 fields of the download request 600. In the case of a key/DTS roster request 700, this will specify the unique key field(s) 402 and the DTS field 406. In step 10.38, having limited the download scope to only certain data fields 402, 406, and/or 410 for each record, the method determines next which set of source database records SRC.RCD.001-N is being targeted: all or some? If the range flag FLAG.RNG specifies all, the process ends at step 10.23: it's been determined that the download request 600 is asking for the specified data fields 402, 406, and/or 410 from each and every source database record SRC.RCD.001-N in the source database 104. Otherwise, the set of partial source database records SRC.RCD.001-N being requested is being limited, in the same manner as the whole records were in steps 10.30-10.34. In step 10.42, the START.DT and STOP.DT fields of the download request 600 are parsed; if these contain a valid starting point and stopping point within the source database 104, then in step 10.44 the download scope is limited to the set of source database records SRC.RCD.001-N within the specified section. A request may be limited by a range specified in START.DT and STOP.DT or quality criteria specified in QUAL.RNG, such as "last names starts with L", so both fields shall be checked and parsed; regardless of whether there was a range specified, in step 10.45 if there is a quality criterium specified in the QUAL.RNG field of the message, then in step 10.46 the download scope is limited or further limited by the specified quality criterium; else the process is complete at step 10.23 with no further limitation. Once the download scope for this subset of partial source database records SRC.RCD.001-N has been limited in range, quality, or both, the source server 102 has all of the information needed to respond to the download request 600, and the process ends at step 10.23. It should be noted that if a subset is specified by the FLAG.RNG field but no limitations are included in the START.DT, STOP.DT, or QUAL.RNG fields, the user has defined a subset including all members of the original set, which, while redundant, is still a valid subset as every set is considered a subset of itself. Similarly, it is possible though redundant to have a download request 600 that specifies a subset containing 0 source database records SRC.RCD.001-N, or 0 data fields 402, 406, and/or 410, as the null set is a subset of every set.

Finally, it should be noted that the method of FIG. 10C encompasses either step 10.00 or step 10.08, which is to receive and parse a message of a specific kind, of the methods of FIGS. 10A and 10B, depending on the contents of the message being parsed, and may also be an instance of neither; for instance, if the method of FIG. 10C determines that the message is not a download request 600 in steps 10.20 and 10.22, then the method of FIG. 10C is not the first step in either the method of FIG. 10A or the method of FIG. 10B. Further, the methods presented in FIGS. 10A and 10B do not begin unless the source server 102 both receives a message and the message, once parsed in the method of FIG. 10C, actually is of the necessary type; in order to complete step 10.00, the received message should ideally be some actionable version of a key/DTS roster request 700 requesting at least the unique key field 402 and DTS field 406 of some set of source database records SRC.RCD.001-N, and in order to complete step 10.08, the received message should ideally be some actionable variation of a request list 704 asking for some set of source database records SRC.RCD.001-N. It is noted again that these download requests 600 may vary in format, encoding, or content to any degree known in the art.

Referring now generally to the Figures, and particularly to FIG. 11, FIG. 11 is a block diagram of the application server 110 of the electronic communications network 100 of FIG. 1 and displaying together both hardware and software aspects thereof, wherein the application system 110 comprises: a central processing unit or "CPU" 110A; a user input module 102B; a display module 110C; a software bus 110D bi-directionally communicatively coupled with the CPU 110A, the user input module 110B, and the display module 110C; the software bus 110D is further bi-directionally coupled with a network interface 110E, enabling communication with alternate computing devices by means of the electronic communications network 100; and an application memory 110F. The application software bus 110D facilitates communications between the above-mentioned components of the application system 110.

The memory 110F of the application system 110 includes an application software operating system OP. SYS 110G. The application software OP. SYS 110G of the application system 110 may be selected from freely available, open source and/or commercially available operating system software, to include but not limited to a.) a Z8 G4 computer workstation marketed by Hewlett Packard Enterprise of San Jose, Calif. and running a Red Hat Linux™ operating system marketed by Red Hat, Inc. of Raleigh, N.C.; (b.) a Dell Precision™ computer workstation marketed by Dell Corporation of Round Rock, Tex., and running a Windows™ 10 operating system marketed by Microsoft Corporation of Redmond, Wash.; (d.) a Mac Pro workstation running MacOS X™ as marketed by Apple, Inc. of Cupertino, Calif.; or (e.) other suitable computational system or electronic communications device known in the art capable of providing networking and operating system services as known in the art. The exemplary application server software program SW.SRC 102H consisting of executable instructions and associated data structures is optionally adapted to enable the application server 110 to (a.) generate messages and communicate with the source server 102 and the target server 106, (b.) process messages received from the source server 102 and the target server 106, and (c.) direct and enable the source server 102 and the target server 106 to perform the invented method upon their respective databases.

Figure 12:
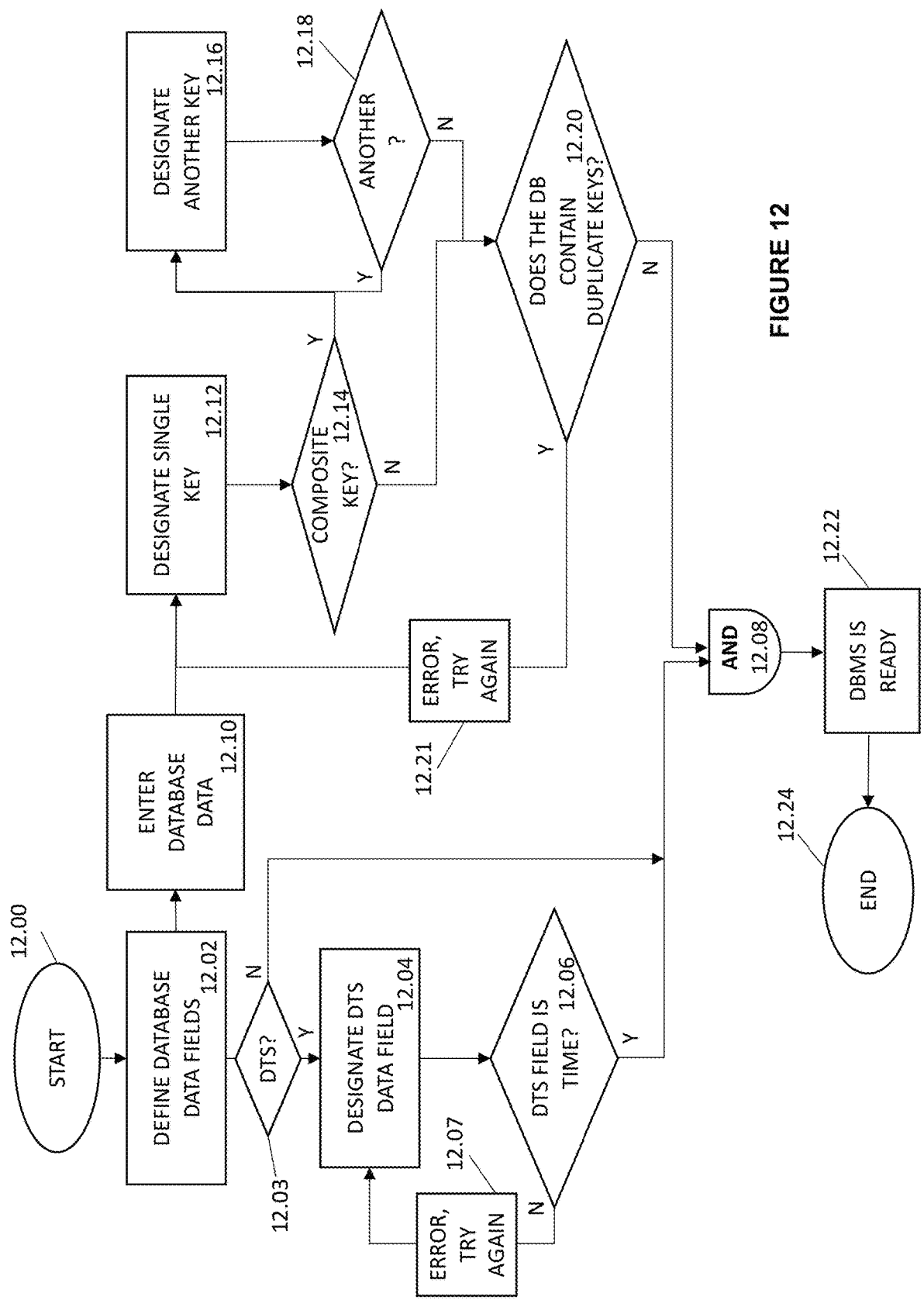
FIG. 12 is a flow chart of a preferred method for initially setting up a database management system in accordance with the invented method.

Referring now generally to the Figures and particularly to FIG. 12, FIG. 12 is a flow chart of a preferred method for initially setting up the source database management system 102I in accordance with the invented method, with particular emphasis regarding inclusion of composite or compound keys as a possible variety of unique keys 404. Details of the invented method regarding the unique key data field 402 and date time stamp data field 406 are also discussed in earlier Figures, particularly FIG. 4. This is a flow chart presenting a possible preferred method as might be followed by a sysadmin or other user setting up the source DMBS 102I to perform the invented method by defining a DTS field 406 and a field 402 or set of fields 402 to form a unique key 404. It is noted that some embodiments of the invented method might be practiced with no DTS 408, or with no unique key 404 or a key field 402 or set of fields 402 that isn't unique and contains duplicates. This flowchart includes a few extra steps that assume the user means to set up a database having unique keys 404, and ensures that the fields 402 chosen produce this result.

In step 12.00, the process begins. In step 12.02, one or more database data fields 402, 406, and/or 410 are defined. For instance, in a database of books, the data fields 402, 406, and/or 410 might include title, author, editor, publication date, language, or genre. This very generic and standard database-related step is included herein only to illustrate that having data fields 402, 406, and/or 410 in the first place would be a prerequisite to designating any of these data fields 402, 406, and/or 410 as instances of the unique keys 404 used in most embodiments of the invented method.

It should be noted as a point of broad overview regarding this flowchart that the pathway 'splits' here because designating the DTS field 406 and designating the unique key field 402 or fields 402 are not steps that are contingent or dependent on each other; it doesn't matter which is done first. The chart flow comes back together at the end using an AND gate 12.08 because the setup entails both the DTS field 406 and the unique key field 404 or unique key fields 404 being designated successfully if used, in order to be ready to perform the invented method successfully.

In step 12.03, the user may select whether to designate a data field 402, 406, or 410 as a DTS field 406, or elect to define this database as not using an embodiment of the invented method that requires a DTS field 406. If no DTS 408 is required, the steps to designate one are bypassed. If there is a DTS field 406 being designated, in step 12.04, now that the data fields are defined, the user selects which of the data fields 402, 406, and/or 410 should be considered the DTS field 406; the database need not have any data stored yet to designate which of the data fields 402, 406, and/or 410 should be viewed by the software performing the invented method as the date time stamp field 406. As represented by step 12.06, the software may also check to ensure that the data field 402, 406, and/or 410 selected is of a datatype that can be read by the system as designating a date and/or time. For instance, a confused user theoretically could tell the software to use a data field 402, 406, and/or 410 containing a Boolean true/false value as the DTS field 406, which could cause the invented method not to work or cause undefined behavior; whatever software is facilitating the setup may optimally prevent this, and in step 12.07 advise the user to select a different data field 402, 406, and/or 410 instead. As a less trivial example, if the software cannot parse a string that says, for instance, "Thursday, September 26, 2019 3:03 PM" as a numerical date and time that can be compared against another date and time to determine which is earlier—then this database setup should ideally not permit the user to select a data field that stores a string, even if the text strings in that data field are still dates and times from a user's perspective; the user may not know whether the system can parse it or not, and the system would ideally make sure the input that will be used for implementing the invented method is in a valid format for doing so. This DTS field 406 is preferably one that stores a value the system can read as signifying a point in time. Once this step is complete, the DTS field 406 is ready; one half of the operation is done. The wedge shape at step 12.08 represents a standard AND logic gate; the process may continue only once both upstream processes are complete.

Moving over to the other thread, at step 12.10 data is entered into the database. The database data could also be entered before the DTS field 406 selection, but need not be. This step precedes selection of the unique key field 402 or fields 402 because the unique key field 402 may require that the data in the data fields not contain duplicates.

Figure 13:
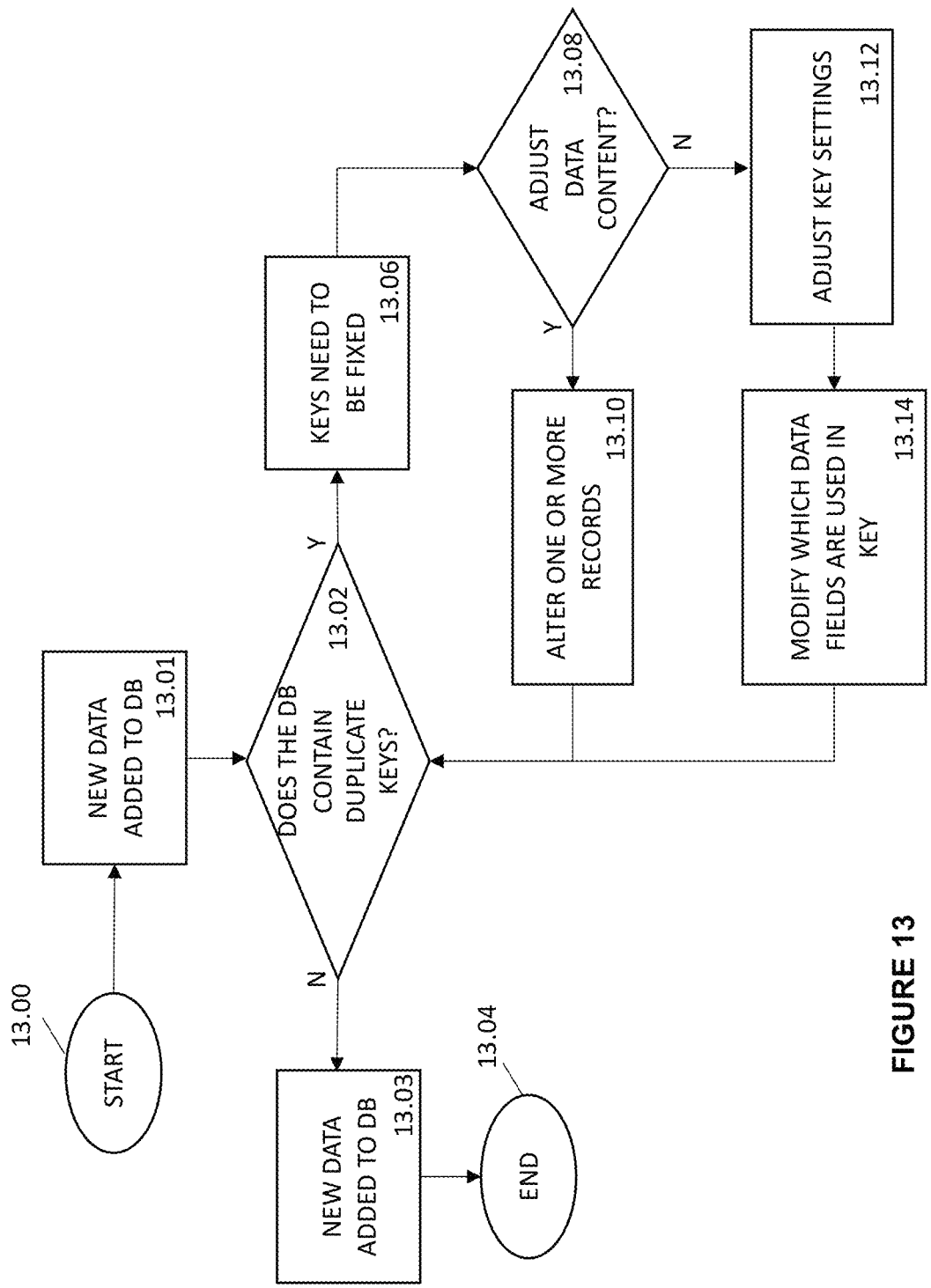
FIG. 13 is a flow chart of a preferred method for updating a database within a database management system previously set up using the method of FIG. 12.

Further, as is presented in FIG. 13, the source DBMS 102I might do a check whenever new data is entered, to ensure that the unique keys 404 are still unique, and prompt a user to correct the situation if not. It practically goes without saying that a database which is organized by identifying records based on 'unique' record identifiers is going to produce some undefined behavior if the data contains duplicate record identifiers, and as several embodiments of the invented method rely on unique identifiers being actually unique, a more complete description of the present method would include noting that the system should ideally prevent that situation from arising. Therefore, while someone configuring the DBMS 102I initially could also designate a unique key data field 402 or data fields 402 that should constitute unique record identifiers and then enter data subsequently, it might cause the system to do an extra check; entering the data first, as presented in step 12.10, is only one preferred method.

In step 12.12, the user configuring the DBMS 102I designates a first unique key data field 402; there ideally has to be at least one for certain alternate embodiments of the invented method to work. If this data field 402 alone constitutes a unique record identifier, for instance, in a set of data that has unique ID numbers as identifiers, the user still has the option of selecting additional fields to form a compound key in step 12.14 regardless. If the user opts to set up a compound key, then the user is prompted to select an additional data field 402 in step 12.16, and may opt to continue to select additional data fields in step 12.18 until all fields they choose to include in the compound key are selected. While data fields 402, 406, and/or 410 are one possible source of unique key 404 data, it should be noted that data not in the records themselves such as metadata or other associated information might be designated as a unique key field 406 also.

To reiterate, regarding compound keys: a database need not have an 'ID number' data field 402 or similar to ensure that all records RCD.001-N in a database are treated as unique and not misidentified as each other, when this database can use compound keys instead, which is a combination, concatenation, or conjunction of at least two data fields taken together as a unique key 404. As a further example of compound keys as a means for identification, one might consider that, in a group of people, names are generally used to identify individuals. If no one in the group shares the same first name, then first names alone might be a single 'data field' sufficient for identifying one and only one person in the group. But if two people do share the same first name, a first name alone is insufficient information for identifying just one individual, so the group might differentiate by expanding the single key to a compound key: that is, using first and last name in conjunction to designate a single specific individual, or by combining one's name with some other data point, e.g. Tall Fred and Short Fred. In a larger database, or one with a lot of similar entries, one might even include more than two data fields in a compound key to ensure unique identification. The only criterion, as indicated in step 12.20, is that there are no duplicates in a system intended to identify each item with a unique identifier; that each unique key 404—single or compound—designates one and only one source database record SRC.RCD.001-N, and the same single corresponding target database record TGT.RCD.001-N. Once the user has selected at least one unique key field 402, and as many additional unique key fields 402 as they might choose to, and the key fields 402 selected support each data record in the database having an unduplicated identifier, this portion of setup is complete. One should note that, for the purposes of presenting the invented method herein, the unique key 404 is usually represented as a single data field even though it could be compound; when the unique key 404 is referenced, it's meant in the sense of whatever designator can be used to designate one and only one record in the database and connect versions of the same record between versions of the same database, encompassing compound keys in that definition.

Once a valid DTS field 406, in certain other alternate preferred embodiments of the invented method, and a valid unique key field 402, such as a single record identifier, record revision identifier, and/or a compound key) have been selected, in step 12.22 the process is complete and the source DBMS 102I has been set up such that the invented method may be used for this database.

It is understood that a source compound key of a source DBMS 102I, in yet additional various preferred embodiments of the invented method, may be generated by extracting or deriving at least two elements of source information that are wholly or partially associated with or contained within a same source records, and that the scope of the meaning of the term source information source includes record identifiers, such as but not limited to prior art record identifiers, and date time stamps of record creations, updates, access and external events.

FIG. 13 is a flow chart of a preferred method for adding data to a database within a database management system previously set up using the method of FIG. 12. The premise regarding this process is simply that the invented method might not work, or might produce undefined behavior such as adding 'ghost' records or deleting or overwriting records that shouldn't be, if the unique keys 404 aren't kept unique, and whether or not the keys 404 remain unique depends on whether the dataset contains any values in the data field 402 or fields 402 collectively designated as the unique key field 402 that match each other. Hence, the process in FIG. 13 is a brief 'check' when new information is added to the database, wherein if the new material includes adding a record RCD.001-N that would have a duplicate key, a user may be prompted to fix it: either by modifying data, because this could easily have been data entry error, or by changing the set of unique key data fields 402 that, viewed in conjunction, should be unique for every record and currently are not. Naturally, if one is practicing an embodiment of the invented method that doesn't require the key field 402 or fields 402 to contain unique values, this entire step of amending the database would be redundant.

In step 13.00, the process begins when new material is added to the source database 104. This may be the creation of one or more new source database records SRC.RCD.001-N or modification of data contained in source database records SRC.RCD.001-N that already exist. In step 13.02, a check is performed, preferably automatically, by software running the source database 104 or the invented method: to determine whether there are duplicate keys in the database. If no, all's well in step 13.04; carry on. If there are duplicate keys, though, it's been determined as of step 13.06 that the keys may require fixing in order for the unique key field 402 of the source database 104 to reliably identify source database records SRC.RCD.001-N. At this point, a user or sysadmin might receive an error message or a prompt; in any case, the database might be either 'down' or unstable until the situation is addressed by someone who can resolve the discrepancy of two or more source database records SRC.RCD.001-N sharing the same 'unique' key 404. In step 13.08, the user is prompted to consider revising some data, particularly the records that now are duplicates; this is a smaller-scale adjustment, pertaining to correcting a likely unintentional data entry error, as the keys 404 are theoretically supposed to be unique and one just got entered which isn't. In step 13.10, if the user so selects, one or more pieces of data in one or more records are modified. Back to step 13.02 to check again: are there still duplicates?Once there are no duplicates, the process is complete and all is well. However, it may be that, to borrow from the example mentioned regarding FIG. 12, the group is growing and 'first names only' are no longer sufficient as unique identifiers in this data set; the user may instead, in step 13.12, opt to change the settings regarding which data fields 402, 406, and/or 410 are included in a unique key field 402 in step 13.14. After that alteration, time for another check: is the database free of unique key 404 duplicates? If so, in step 13.04 the database is once again ready to successfully implement preferred embodiments of the invented method expecting unique record identification. Finally, it should be noted that other data fields 406 and/or 410 not designated as the unique key field 402 may repeat data indiscriminately, and further that individual components of a compound key may duplicate as long as compound key combinations do not. To reference the names example again: one can have two 'Bob's as long as people are being identified by last names too, but two 'Bob Smiths' would indicate that it's time to either call one of them Robert, i.e. change the data; incorporate middle names, i.e. expand the compound key; or call them 'Tall Bob' and 'Short Bob' because their names are the same but their heights are different, i.e. change which fields comprise the compound key.

It is further understood that a target compound key of the target DBMS 106I in even additional various preferred embodiments of the invented method, may be generated by extracting or deriving at least two elements of source information that are wholly or partially associated with or contained within a same target record, and that the scope of the meaning of the term target information source includes record identifiers, such as but not limited to prior art record identifiers, and date time stamps of record creations, updates, access and external events.

Figure 14:
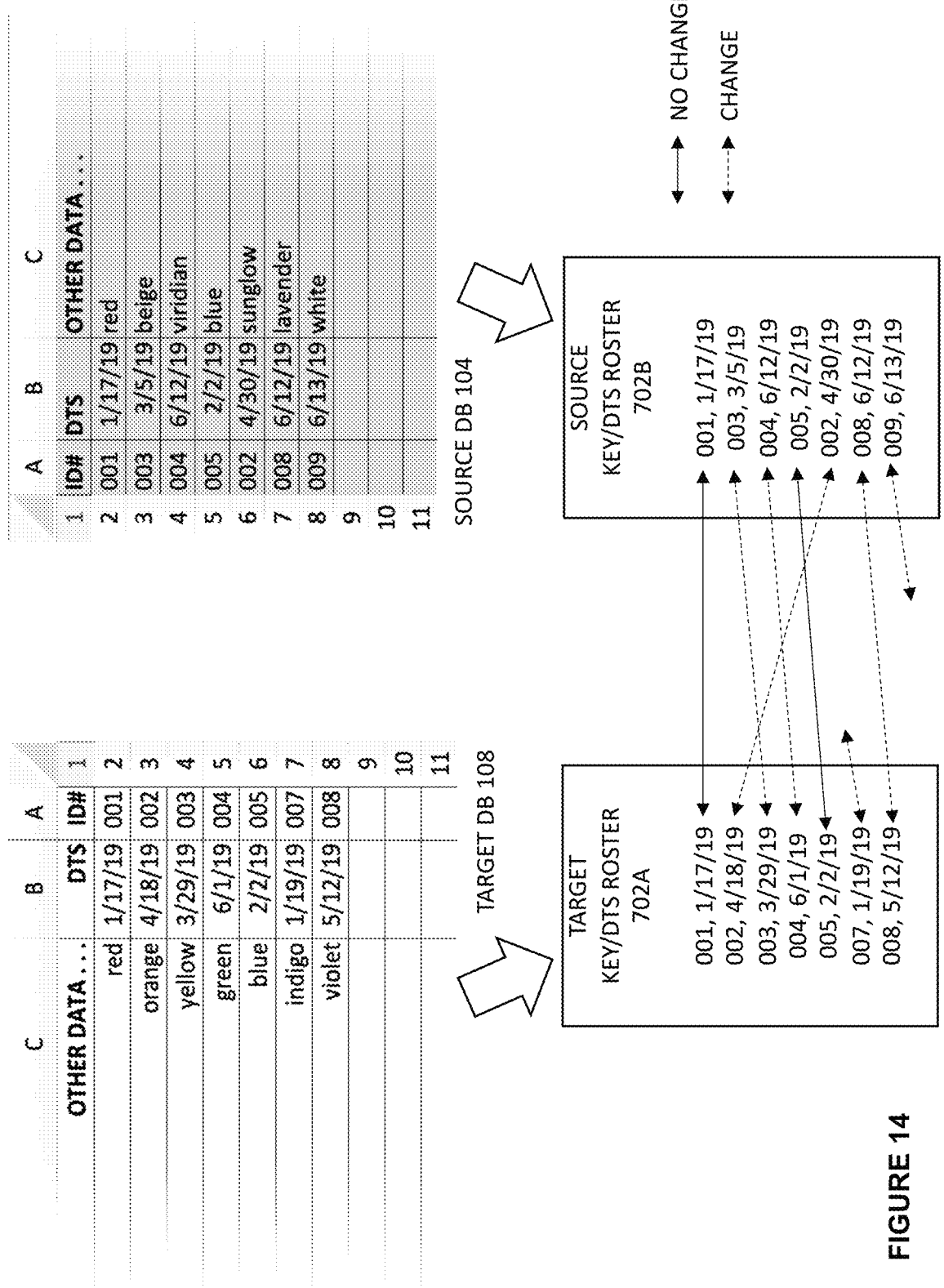
FIG. 14 is a diagram using the example data of FIGS. 7A through 7G to present an additional embodiment of the invented method wherein each database produces a roster and these two rosters are compared against each other.

Referring now generally to the Figures and particularly to FIG. 14, FIG. 14 is a diagram using the same example data from FIGS. 7A through 7G to illustrate an additional preferred embodiment of the invented method wherein the source database 104 and the target database 106 each respectively generate their own key/DTS rosters 702A and 702B, and the two rosters 702A and 702B are compared with each other as a proxy for a direct comparison of the two databases 104 and 108. This embodiment might be particularly desired if a third server such as the application server 110 is handling the processing load of keeping the target database 108 up-to-date; all the database servers 102 and 106 need do is provide access to their respective databases 104 and 108 and send their respective rosters 702, and the application server 110 does the comparison work and supplies the target database 108 with updates. One skilled in the art will recognize that, even though an additional roster 702 is being created that wasn't in the previous embodiment explained herein, this is a fairly trivial variation in how the invented method is practiced overall.

In this diagram, the target database 108 is represented in the upper left hand corner as labeled, with an arrow beneath the target database 108 representing the assembly of a target key/DTS roster 702A containing entries that may adequately represent each record in the target database 108 for comparison purposes. Likewise, the source database in the upper right hand corner of the diagram is represented as producing the key/DTS roster 702, presented in previous illustrations as the only key/DTS roster 702 but differentiated here as a source key/DTS roster 702B.

In the lower portion of the diagram, the two rosters 702 are compared. A key to the right indicates that a solid line represents no difference between the records, and a dotted line indicates a difference between the records. The comparison as presented indicates that the target database records TGT.RCD.001 and TGT.RCD.005 having the unique key 404 values 001 and 005 are up to date; the unique key 404 values 002, 003, 004, and 008 are represented in both key/DTS rosters 702A and 702B but their DTS 408 values are different, indicating that updated source database records SRC.RCD.001-N for these corresponding target database records TGT.RCD.001-N are available; the target database record TGT.RCD.007 having the unique key 404 value 007 is represented in the target key/DTS roster 702A but not the source key/DTS roster 702B, indicating a target database record TGT.RCD.007 that would be archived or deleted; and the unique key 404 with the value 009 is in the source key/DTS roster 702B but not the target key/DTS roster 702A, indicating a new source database record SRC.RCD.009 available for download. The target database record TGT.RCD.003 having the unique key 404 value 003 might be further tagged as problematic, if the option is available, for having a source DTS 408 that predates the target DTS 408. This is the exact same example data that was used for the example in FIGS. 7A through 7G.

Figure 15:
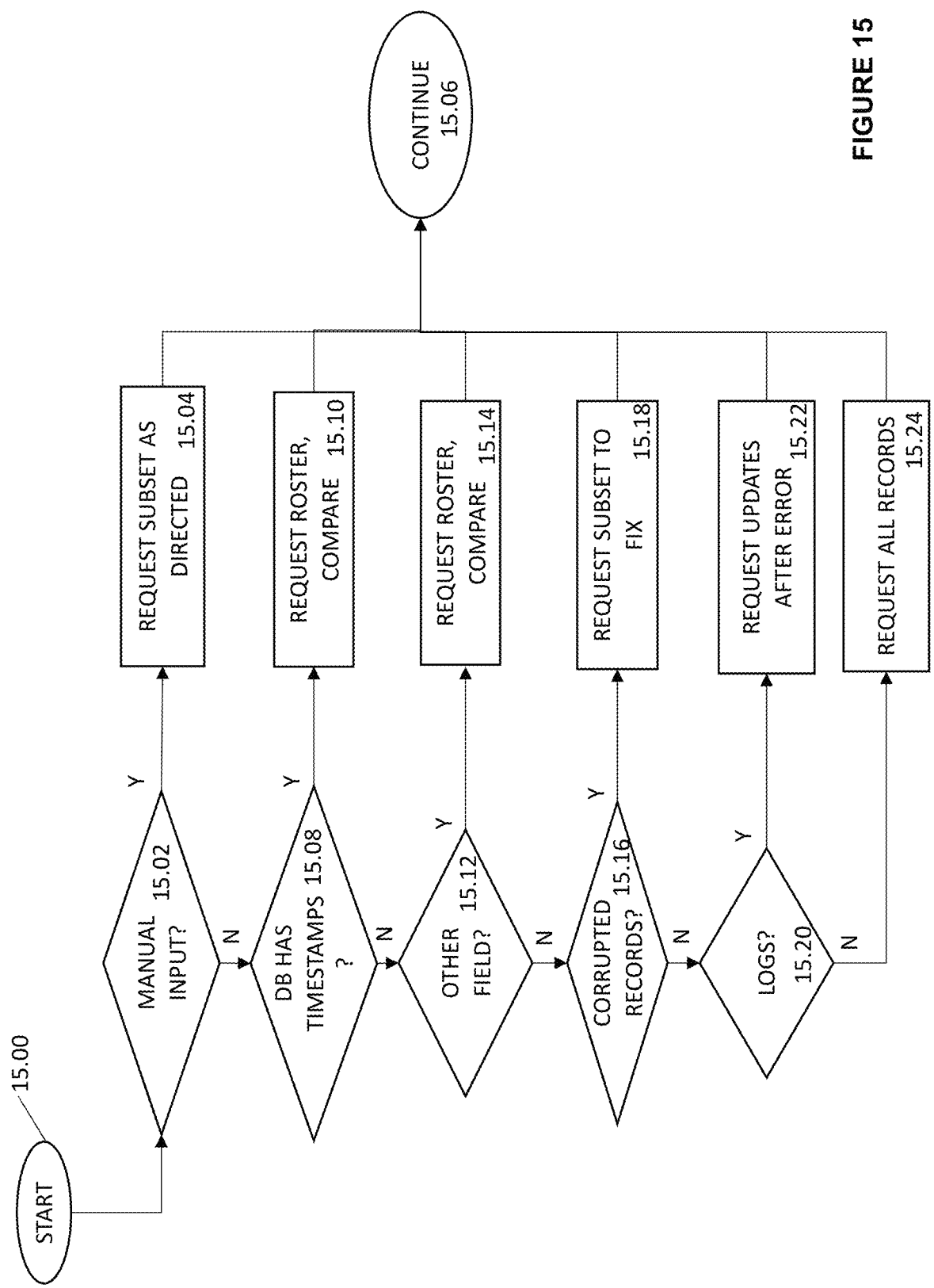
FIG. 15 is a flow chart presenting some methods for determining the selection method for choosing which records the target database of FIG. 1 should download.

Referring now generally to the Figures and particularly to FIG. 15, FIG. 15 is a flowchart presenting a detail view of step 8.01 that includes multiple methods by which the target server 106 might determine how to select which records should be updated and what request should be made of the source server 102. This includes variations in which the databases 104 and 108 are limited by a circumstance such as lack of a DTS field 408 or other timestamp, which might limit the extent to which the invented method can be practiced or the manner in which the invented method is applied. This chart presents several alternative methods for the target database 108 trying to get re-synchronized with the source database 104, such as following a system crash, to determine which records should be requested from the source database 104.

In step 15.00, the process begins. The target database 108 determines how to select which records to request in order to synchronize with the source database 104. In step 15.02, the possibility is accounted for that the target server 106 has been specifically directed to download a set of records, by a user or even by the source server 102. In step 15.04, it's clear in this instance what should be selected and requested: the already specified records 706A-D. As this flow chart is only showing a detail of how the target server 106 might determine which records should be downloaded, the process of this chart is complete once it's determined what to request; the CONTINUE at step 15.06 would lead onward to actually sending the download request 600 to the source server 102, receiving the selected records 706A-D, doing the update, and so on, as presented in other Figures.

Moving on to a second option, if a user hasn't specified a subset of records, at step 15.08, the preferred embodiment in which the target database 108 includes a DTS field 406 that contains points in time when each of the target database records TGT.RCD.001-N were last updated or modified. If this is the case, then in step 15.10, the target server 106 requests the key/DTS roster 702 from the source server 102 so that a comparison can be done and a request list 704 can be derived, consistent with the invented method. Once this has been determined, the process of this chart is over at step 15.06.

However, it's possible that there is no DTS field 406 and the user hasn't given any instructions. Step 15.12 offers another possible method for determining whether time has passed or updates have happened since a record was last updated: one might compare two versions of a data field that changes frequently or is expected to have changed, but isn't a date or time. As an example, hypothetically the database in question may contain baseball statistics. "Total Number of Games" is an example of a data field 402, 406, and/or 410, in that particular database's data set, that one would expect to increment frequently, or change any time the data changes at all; that number's having changed would fairly reliably indicate that time has passed or that a target database record TGT.RCD.001-N having a different value from the corresponding source database record SRC.RCD.001-N should be updated. Another example might be a database that includes stock prices; these are always fluctuating, so their having changed may indicate time has passed. This kind of application would be particular to the database contents, but is an example of an adequate alternative implementation of a DTS field 406 that doesn't use a timestamp value. In this case, the data field 406 expected to change over time would simply be substituted for the DTS field 406 on the key/DTS roster 702 requested from the source server 102. If one elects to conceptualize the matter this way, chronological timestamps themselves only work because the current time and date happens to be another example of a datum the value of which reliably changes over time—every second, minute, hour, and day, this value changes to a new and unique quantity that never repeats, in a predictable pattern. If the database is set up to use one or more of the constituent data fields 402, 406, and/or 410 in this manner and request a roster with the DTS field 406 replaced by some other suitable data field 406, that is our selection, per step 15.14, and the process is done at step 15.06; it has successfully been determined how to ask for the records to get the target database 108 to be synchronized back to the source database 104 standard.

If not, though, step 15.16 offers an additional possible method for determining at least some of the files that shall be accessed. If the target server 106 is recovering from a crash in which data was lost, which is one good reason why the target database 108 might elect to sync back up with the source server 102, then it's possible that some files or records got corrupted or damaged. The computer system of the target server 106 should be able to scan or check for corrupted or damaged data—which is often evident to a computer simply by being inconsistent or syntactically strange, without having to parse or understand what the contents should be—and if it can be determined that some records got damaged and which ones, then it's clear in step 15.18 that the target server 106 should download new copies of all the damaged records. This may be a good preliminary step for a target server 106 recovering from a crash even if further means for a more fine-tuned update, such as date time stamps 408, are available; iterating through potentially corrupted or scrambled data can be risky in any case, and it's a simple problem to avoid when the system has access to definitively non-corrupted copies of these records and the damaged ones can be safely discarded and replaced.

As a final example herein of what alternative means might be available to determine which records the target server 106 should download, and assuming the unideal absence of the DTS field 406 and nonavailability of other, less nebulous approaches, step 15.20 suggests that the un-updated target database records TGT.RCD.001-N might be deduced by comparison of system logs, if available. For instance, if the target server 106 lost data as a result of a system crash, the system log might indicate what time the crash occurred. The system log of the source server 102 might indicate when the target server 106 went offline. If there's a transaction, download, or update log being kept on either server, it might be possible to determine which of the most recent updates available from the source server 102 the target server 106 might have missed while crashing and recovering, or even when the target server 106 last downloaded something, what the download was, and what updates are available that postdate that one. All of these logs could be kept by the database software, might make good fail safes anyway, and would provide a means to determine what the target server 106 missed and should 'catch up on' to be up to date with the source server 102, without including a DTS field 406 in any of the records themselves. If there are logs, then in step 15.22 the information from the logs is used to request record downloads accordingly, such as requesting all of the updates that postdate the point at which the target server 106 crashed.

Finally, at step 15.24, there is always the zero-optimization option available of 'download everything just in case'. It should be noted that, while this Figure and discussion offer useful examples of some ways to determine which records the target server 106 should request, other algorithms or methods might also be suitable for this aspect of practicing the invented method, and this list of possible solutions shouldn't be construed as limiting or exhaustive.

Referring now generally to the Figures and particularly to FIG. 16, FIG. 16 is an example database table 1600 containing simple example data suited to present and demonstrate implementation of compound unique keys 404 as described herein. The database table 1600 consists of one header row and 9 data rows identified by the numbers 1 through 9 and representing hypothetical database records REC.001-9, and one header column and four data columns identified by the letters A through E and representing data fields 402, 406, and/or 410 of the records REC.001-9.

In the data contained in the table 1600, column A contains names of shapes, column B contains names of colors, column C contains calendar dates, column D contains words describing condition, and column E contains first names of people.

A user or sysadmin selecting which of the data fields A-E of the example to designate as the unique key field 402 might first notice that the only one of the data fields A-E containing all unique values is column C. While theoretically the same data field C could function as both DTS field 406 and unique key field 404, a knowledgeable user might recognize that the DTS field 406 is subject to frequent change and a datum such as the timestamp indicating when a record was last modified may not always be unique between records even though this happens to be the case just now, and this may not be an optimal choice as the unique key field 402 in most implementations.

With compound keys as an option, there are better solutions available within this example data set anyway. Keeping in mind that the ideal situation is unique keys 404 that are in fact unique, and being able to select two or more data fields A-E to combine, concatenate, or otherwise use in conjunction as a compound key, one might observe that columns A and B, taken together, contain no duplicated pairs: (1) red circle, (2) red triangle, (3) blue square, (4) yellow rectangle, (5) green circle, (6) green square, (7) green hexagon, (8) blue triangle, and (9) yellow circle. Column D paired with column A is less ideal because there are two records REC.001 and REC.009 containing both good and circle; column D paired with column B is less ideal because there are two records REC.004 and REC.009 that contain both good and yellow. Column E paired with column A is less ideal, as there are two records REC.001 and REC.005 in which Calvin is paired with circle; and column E paired with column B is less ideal, as there are two records REC.003 and REC.008 in which Karen is paired with blue. Which data fields A-E are considered suitable for the organization of a particular database would be at the discretion of a user or admin, perhaps assisted by a software program that assesses the available data for what the best model 'usually' might be in similar databases. Based on the adjectives apparently indicating condition in column D, one might surmise that the contents of this data field D would change incrementally over time as 'wear and tear' occurs, and may not be the best for consistently identifying items; depending on the particular database, that assumption might be mistaken, and the color data field B might change more frequently. Which data fields A-E are sensible to select as components of a compound unique key 404 depends on the database, and may change over time. For instance, if this example database table 1600 were to have more similar records REC.010-N added over time, there could easily someday be a duplication of 'blue square' or 'yellow triangle', at which point, if keeping the keys unique is necessary, the compound key might be expanded to include column E, then identifying record REC.003 as 'Karen blue square' and record REC.009 as 'Dan yellow triangle'. This table example should be considered only as a basic and hypothetical additional exercise or example, to expound on the concept of compound keys as a variety of unique key 404 for use in managing databases.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs consisting of executable instructions and associated data structures or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code or executable instructions, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based herein. Accordingly, the disclosure of the embodiments of the invention is intended to be illustrative, but not limiting, of the scope of the invention, which is set forth in the following claims.

I claim:
1. A computer-implemented method comprising:
   a. Storing a source database in a computer system, wherein a plurality of source records of the source database each include a date time stamp of a most recent revision and a unique record identifier, wherein each record identifier is a unique signifier within the source database and a record creation event is a type of record revision;

b. Storing a target database in a transient, persistent memory, wherein the target database receives copies of revisions of the plurality of source records;

c. Selecting within the target database of a plurality of records to update;

d. Generating a nonpersistent source work file comprising source record value pairs extracted from each current source record of the plurality of source records, and each source record value pair extracted from a same source record and including a source record identifier and a most recent source date time stamp of the same source record;

e. Sorting the source record value pairs of the nonpersistent source work file into a nonpersistent source ordered list according to a value sequence of individual source record identifiers of the records from which the source record value pairs are generated;

f. Generating a nonpersistent target work file comprising target record value pairs extracted from each current target record of the plurality of target records, and each target record value pair is extracted from an individual target record and including a target record identifier and a most recent target date time stamp of a same target record;

g. Sorting the target record value pairs of the nonpersistent target work file into a nonpersistent target ordered list according to the value sequence of the record identifiers of the target record value pairs as applied to order the nonpersistent source ordered list of the nonpersistent source work file;

h. Comparing the nonpersistent source work file and the nonpersistent target work file to generate a nonpersistent retrieval work file that lists source record value pairs not found to be matched in the nonpersistent target work file by a target record value pair having a same target record identifier and target date time stamp, wherein record identifiers listed as source record value pairs in the nonpersistent source work file and not present as target record value pairs in the nonpersistent target work file are added to the nonpersistent retrieval work file;

i. Writing all source records having corresponding source record identifiers listed in the nonpersistent retrieval work file into the target database; wherein record updating received by the target database from the source database is unidirectional; and j. Setting an archive field of at least one record to a deletion indicator value, wherein the said at least one record is referenced by at least one target record value pair in the target work file and not present as a source record value pair in the source work file.

2. The computer-implemented method of claim 1, further comprising deleting any target record having a record identifier which corresponds to the record identifier of a source record, when the source record comprises an archive field having a deletion indicator value.

3. The computer-implemented method of claim 1, wherein each source record has an archive field and no source record value pair of a source record having any archive field set to a deletion indicator value is written into the nonpersistent source work file.

4. The computer-implemented method of claim 1, wherein each source record has an archive field and only source record value pairs of source records having any archive field set to an active record indicator value are written into the nonpersistent source work file.

5. The computer-implemented method of claim 1, wherein the source record identifier may be a compound key comprising information sourced from two or more data fields of the source record comprising the source record identifier.

6. The computer-implemented method of claim 1, wherein the target record identifier may be a compound key comprising information sourced from two or more data fields of the target record comprising the target record identifier.

7. The computer-implemented method of claim 1, wherein the plurality of source records is assigned to individual threads of the multithreaded process in view of each date time stamp of the individual source record.

8. The computer-implemented method of claim 1, wherein the source database is a database selected from the group of database types comprising a relational database, a NOSQL database, a graph database, an object-oriented database, an XML code, a JSON code, one or more flat digitized software files, and one or more Software-as-a Service databases accessible via a communications network.

9. The computer-implemented method of claim 1, wherein each source record value pair extracted from the source database has a date time stamp corresponding to a time no earlier than indicated by a pre-selected date time value.

10. The computer-implemented method of claim 1, wherein at least one target record has an archive field indicating that a corresponding source record is deleted.

11. The computer-implemented method of claim 1, wherein the at least one target record further comprises additional source data record field content of the corresponding source record that was present at the time of the corresponding source record being deleted from the source database.

12. The computer-implemented method of claim 1, wherein the computer memory storing the target database is integral to the computer system.

13. The method of claim 1, wherein a memory storage for the computer system storing the nonpersistent source ordered list, the nonpersistent target ordered list, or the nonpersistent retrieval work file ordered list is selected from the memory group consisting of disk storage, block storage, system memory, or a database table.

14. The method of claim 1, wherein the transient, persistent memory storing the target database is selected from the memory group consisting of disk storage, block storage, system memory, or a database table.

15. A database management system, comprising:
a processor comprising hardware; and
a transient persistent memory storing a database management system software adapted to update a first database with information received via an electronic communications network and
the memory further storing executable instructions that, when executed by the processor, perform operations comprising:

a. Storing a source database in a computer system, wherein a plurality of source records of the source database each include a date time stamp of a most recent revision and a unique record identifier, wherein each record identifier is a unique signifier within the source database and a record creation event is a type of record revision;

b. Storing a target database in a computer memory, wherein the target database receives copies of revisions of the plurality of source records;

c. Selecting within the target database of a plurality of records to update;
d. Generating a nonpersistent source work file comprising source record value pairs extracted from each current source record of the plurality of source records, and each source record value pair extracted from a same source record and including a source information and a most recent source date time stamp of the same source record;
d. Sorting the source record value pairs of the nonpersistent source work file into a nonpersistent source ordered list according to a value sequence of individual source record identifiers of the source records;
e. Generating a nonpersistent target work file comprising target record value pairs extracted from each current target record of the plurality of target records, and each target record value pair extracted from a same target record and including a target information and a most recent target date time stamp of the same target record;
f. Sorting the target record value pairs of the nonpersistent target work file into a nonpersistent target ordered list according to the value sequence of individual record identifiers of the target records as applied to order the source ordered list of the source work file;
g. Comparing the nonpersistent source work file and the nonpersistent target work file to generate a nonpersistent retrieval work file that lists source record value pairs not found to be matched in the nonpersistent target work file by a target record value pair having a same target record identifier and target date time stamp;
h. Writing all source records having corresponding source record value pairs listed in the nonpersistent retrieval work file into the target database; and
i. Deleting from the target database at least one record not listed within a source record value pair in the source work file and present in at least one target record value pair in the target work file.

16. The database management system of claim 15, wherein records listed as target record value pairs in the nonpersistent target work file and not present as source record value pairs in the nonpersistent source work file have an archive field set to a deletion indicator value.

17. The database management system of claim 15, wherein the computer memory storing the target database is integral to the database management system.

18. The database management system of claim 15, wherein the transient persistent memory storing the target database is external to the database management system.

19. A database management system, the database management system bi-directionally communicatively coupled with a computer system that stores a source database, wherein a plurality of source records of the source database each include a date time stamp of a most recent revision and a unique record identifier, and each record identifier is a unique signifier within the source database, the database management system comprising:
a processor comprising hardware; and
a memory storing a database management system software adapted to update a first database with information received via an electronic communications network and the memory
further storing executable instructions that, when executed by the processor, perform operations comprising:

a. Storing a target database in a computer memory, wherein the target database receives copies of revisions of the plurality of source record and stores the revisions of the plurality of source records as target records, and a record creation event is processed as a type of record revision;
b. Generating a new or truncated nonpersistent temporary table from a prior comparison operation;
c. Writing at least one key and at least one archive value for each record in the source database into the nonpersistent temporary table;
d. Comparing all of the keys of active records of the nonpersistent temporary table with a SQL statement to determine which records referenced by the nonpersistent temporary table are missing or marked as archived in the target database table;
e. Generating a nonpersistent refresh list of the record identifiers of each target database record determined to require an update;
f. Downloading all records associated with a record identifier of the nonpersistent refresh list from the source database and adding each downloaded record to the target database;
g. Comparing records in the nonpersistent temporary table and the target database table to determine which records that are marked archived in the nonpersistent temporary table are showing as active in the target database table by checking all active records in the target database table against the list of active records in the nonpersistent temporary table; and
i. Deleting from the target database at least one record not listed in the nonpersistent temporary table and present in the target table.

20. The database management system of claim 19, wherein records not listed in the nonpersistent temporary table and present in the target table have an archive field set to a deletion indicator value.

21. The database management system of claim 20, wherein the executable instructions further direct the processor to perform additional operations of writing each timestamp from the source database for each record associated with a record identifier in the nonpersistent temporary table into the nonpersistent temporary table prior to comparing all of the keys in the target database table with a SQL statement to determine which records are missing from the target database or marked as archived in the target database.

22. The database management system of claim 19, wherein the executable instructions still further direct the processor to perform additional operations of comparing all of the keys in the target database table with a SQL statement to determine which records are missing from the target database or marked as archived in the target database.

23. The database management system of claim 19, wherein the executable instructions further direct the processor to perform additional operations of comparing time stamps associated with a target database table record and nonpersistent temporary table entry associated with the same key to determine whether the record in the target database is current, or whether the source database contains a newer version of the record.

24. The database management system of claim 19, wherein the executable instructions further direct the processor to perform additional operations comprising:

a. Applying a fixed or configurable or automatically determined starting time to filter the records in the source database table into the nonpersistent temporary table;
b. Generating an ancillary list of record identifiers of added or changed records from only a plurality of active records captured in the nonpersistent temporary table to add or update the record data in the target table; and
c. Downloading the source records associated of record identifiers of the ancillary list, and inserting or updating the corresponding target database records associated of record identifiers in the target table with the newly downloaded records.

25. The method of claim 24, wherein the executable instructions further direct the processor to perform additional operations of marking each target record of the target database referenced in the target table as archived when a same record identifier of the nonpersistent temporary table is marked as archived.

26. The method of claim 25, wherein the executable instructions further direct the processor to perform the method upon a designated subset of the records in the target database.

27. A computer-implemented method comprising:
a. Storing a source database in a computer system, wherein a plurality of source records of the source database each include a source update indicator of a most recent update and a unique record identifier, wherein each record identifier is a unique signifier within the source database and a record creation event is a type of record revision;
b Storing a target database in a transient, persistent memory, wherein the target database receives copies of revisions of the plurality of source records;
c. Selecting within the target database of a plurality of records to update;
d. Generating a nonpersistent source work file comprising source record value pairs extracted from each current source record of the plurality of source records, and each source record value pair extracted or derived from a same source record and including the source record identifier and the source update indicator of the most recent update of the same source record;
e. Sorting the source record value pairs of the nonpersistent source work file into a nonpersistent source ordered list according to a value sequence of individual source record identifiers of the records from which the source record value pairs are generated;
f. Generating a nonpersistent target work file comprising target record value pairs extracted from each current target record of the plurality of target records, and each target record value pair is extracted from an individual target record and including a target record identifier and a target update indicator of a most recent update of a same target record;
g. Sorting the target record value pairs of the nonpersistent target work file into a nonpersistent target ordered list according to the value sequence of the record identifiers of the target record value pairs as applied to order the nonpersistent source ordered list of the nonpersistent source work file;
h. Comparing the nonpersistent source work file and the nonpersistent target work file to generate a nonpersistent retrieval work file that lists source record value pairs not found to be matched in the target work file by a target record value pair having a same target record identifier and target update indicator; and
i. Writing all source records having corresponding source record value pairs listed in the retrieval work file into the target database.

28. The method of claim 27, wherein the computer system performs the method upon a designated subset of the records in the target database.

* * * * *